United States Patent [19]

Sachs et al.

[11] Patent Number: 5,255,384
[45] Date of Patent: Oct. 19, 1993

[54] MEMORY ADDRESS TRANSLATION SYSTEM HAVING MODIFIABLE AND NON-MODIFIABLE TRANSLATION MECHANISMS

[75] Inventors: Howard G. Sachs, Los Altos; James Y. Cho, Los Gatos, both of Calif.

[73] Assignee: Intergraph Corporation, Huntsville, Ala.

[21] Appl. No.: 766,906

[22] Filed: Sep. 26, 1991

Related U.S. Application Data

[63] Continuation of Ser. No. 915,094, Oct. 3, 1986, abandoned, which is a continuation-in-part of Ser. No. 794,090, Oct. 31, 1985, abandoned, which is a continuation-in-part of Ser. No. 704,497, Feb. 22, 1985, abandoned.

[51] Int. Cl.⁵ .............................................. G06F 12/10
[52] U.S. Cl. ........................................ 395/425; 395/400; 364/DIG. 1; 364/243; 364/243.4; 364/243.41; 364/256.3; 364/256.4
[58] Field of Search ............................ 395/400, 425

[56] References Cited

U.S. PATENT DOCUMENTS

| | | | |
|---|---|---|---|
| 3,693,165 | 9/1972 | Reiley et al. | 395/425 |
| 3,723,976 | 3/1973 | Alvarez et al. | 395/425 |
| 3,761,881 | 9/1973 | Anderson et al. | 395/400 |
| 3,764,996 | 10/1973 | Ross | 395/425 |
| 3,896,419 | 7/1975 | Lange et al. | 395/250 |
| 3,898,624 | 8/1975 | Tobias | 395/250 |
| 3,902,164 | 8/1975 | Kelley et al. | 395/400 |
| 3,956,737 | 5/1976 | Ball | 395/425 |
| 4,037,209 | 7/1977 | Nakajima et al. | 395/400 |
| 4,057,848 | 11/1977 | Hayashi | 395/400 |
| 4,068,303 | 1/1978 | Morita | 395/400 |
| 4,077,059 | 2/1978 | Cordi et al. | 395/600 |
| 4,144,563 | 3/1979 | Heuer et al. | 395/800 |
| 4,151,593 | 4/1979 | Jenkins et al. | 395/425 |
| 4,161,024 | 7/1979 | Joyce et al. | 395/325 |
| 4,173,783 | 9/1979 | Couleur et al. | 395/275 |
| 4,181,934 | 4/1980 | Marenin | 395/275 |
| 4,189,767 | 6/1980 | Ahuja | 395/425 |
| 4,208,716 | 7/1980 | Porter et al. | 395/425 |
| 4,215,402 | 8/1980 | Mitchell et al. | 395/400 |
| 4,229,789 | 10/1980 | Morgan et al. | 395/500 |
| 4,253,145 | 1/1981 | Goldberg | 395/500 |
| 4,276,594 | 6/1981 | Morley | 395/800 |
| 4,295,193 | 10/1981 | Pomerene | 395/375 |
| 4,315,310 | 2/1982 | Bayliss et al. | 395/275 |
| 4,354,225 | 2/1982 | Frieder et al. | 395/275 |
| 4,360,869 | 5/1982 | Stanley | 395/375 |
| 4,381,541 | 4/1983 | Baumann et al. | 395/425 |
| 4,386,402 | 5/1983 | Toy | 395/400 |
| 4,392,200 | 7/1983 | Arulpragasam et al. | 395/425 |

(List continued on next page.)

FOREIGN PATENT DOCUMENTS

| | | |
|---|---|---|
| 60-41146 | 3/1985 | Japan . |
| 60-120450 | 6/1985 | Japan . |
| 60-144847 | 7/1985 | Japan . |
| 1444228 | 7/1976 | United Kingdom . |

OTHER PUBLICATIONS

Losq, et al., "Conditional Cache Miss Facility For Han-
(List continued on next page.)

*Primary Examiner*—Paul V. Kulik
*Attorney, Agent, or Firm*—Townsend and Townsend Khourie and Crew

[57] ABSTRACT

A Cache-Memory Management System provides high speed virtual to real address translation. Address translation logic, comprised of mutually exclusive modifiable and nonmodifiable translation logic, selectively provides real address output responsive to the externally supplied virtual address from the processor. The modifiable translation logic includes modifiable read-write memory, while the non-modifiable translation logic includes fixed combinational logic for providing predefined translations of predetermined virtual addresses to real addresses. A controller selectively accesses main memory on cache memory misses to load translation information and other data from main memory to the cache memory. In a preferred embodiment, the address translation logic provides an associated system tag defining access priorities and access modes with each address translation.

22 Claims, 23 Drawing Sheets

TLB SUBSYSTEM

U.S. PATENT DOCUMENTS

| | | | |
|---|---|---|---|
| 4,398,243 | 7/1983 | Holberger | 395/375 |
| 4,400,774 | 8/1983 | Toy | 395/425 |
| 4,405,980 | 9/1983 | Hess | 364/140 |
| 4,407,015 | 9/1983 | Ziobro | 395/775 |
| 4,407,016 | 9/1983 | Bayliss et al. | 395/275 |
| 4,433,389 | 2/1984 | York et al. | 395/400 |
| 4,439,829 | 3/1984 | Tsiang | 395/425 |
| 4,445,177 | 4/1984 | Bratt et al. | 395/800 |
| 4,456,954 | 6/1984 | Bullions et al. | 395/425 |
| 4,464,712 | 8/1984 | Fletcher | 395/425 |
| 4,481,573 | 11/1984 | Fukunaga et al. | 395/400 |
| 4,482,952 | 11/1984 | Akagi | 395/400 |
| 4,493,020 | 1/1985 | Kim et al. | 395/375 |
| 4,498,135 | 2/1985 | Caudel | 395/800 |
| 4,500,962 | 2/1985 | Lemaire et al. | 395/425 |
| 4,502,110 | 2/1985 | Saito | 395/425 |
| 4,507,728 | 3/1985 | Sakamoto et al. | 395/375 |
| 4,513,369 | 4/1985 | Sato | 395/400 |
| 4,563,737 | 1/1986 | Nakamura et al. | 395/400 |
| 4,581,702 | 4/1986 | Saroka et al. | 395/425 |
| 4,604,688 | 8/1986 | Tone | 395/400 |
| 4,620,275 | 10/1986 | Wallach et al. | 395/800 |
| 4,635,194 | 1/1987 | Burger et al. | 395/375 |
| 4,654,819 | 3/1987 | Stiffler et al. | 395/425 |
| 4,669,043 | 5/1987 | Kaplinsky | 395/400 |
| 4,680,700 | 7/1987 | Hester et al. | 395/400 |
| 4,680,702 | 7/1987 | McCarthy | 395/775 |
| 4,682,281 | 7/1987 | Woffinden et al. | 395/400 |
| 4,685,082 | 8/1987 | Cheung et al. | 365/49 |
| 4,899,275 | 2/1990 | Sachs et al. | 395/425 |

OTHER PUBLICATIONS dling Short/Long Cache Requests," IBM TDB, vol. 25, No. 1, Jun. 1982, pp. 110-111.

MC68120/MC68121—Intelligen Peripheral Controller Users Manual, Motorola, Inc.

Electronics International, vol. 55, No. 16, Aug. 1982, pp. 112-117, N.Y., 115; P. Knudsen: "Supermini goes multiprocessor route to put it up front in performance".

CPU

FIG_3

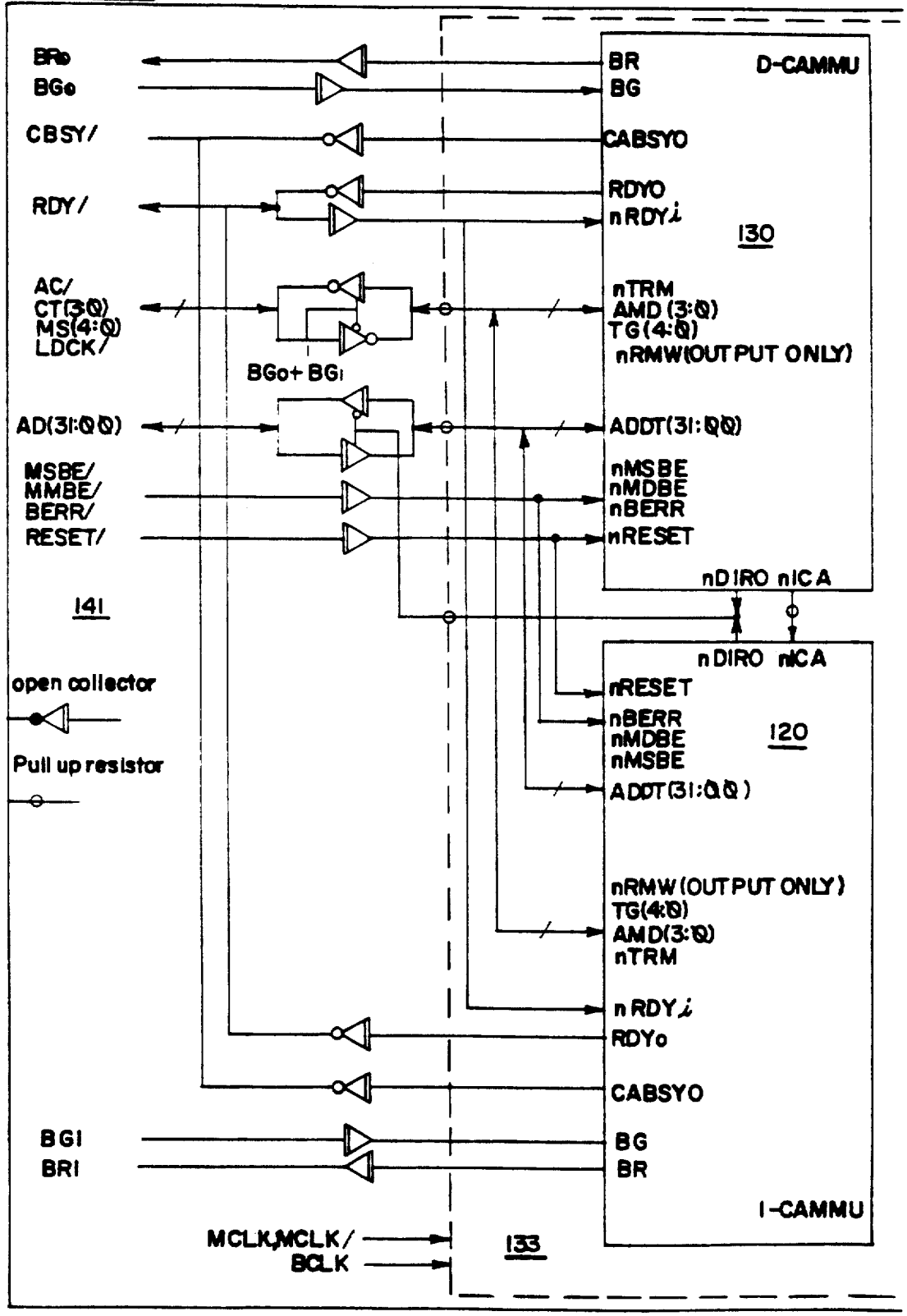
FIG_5

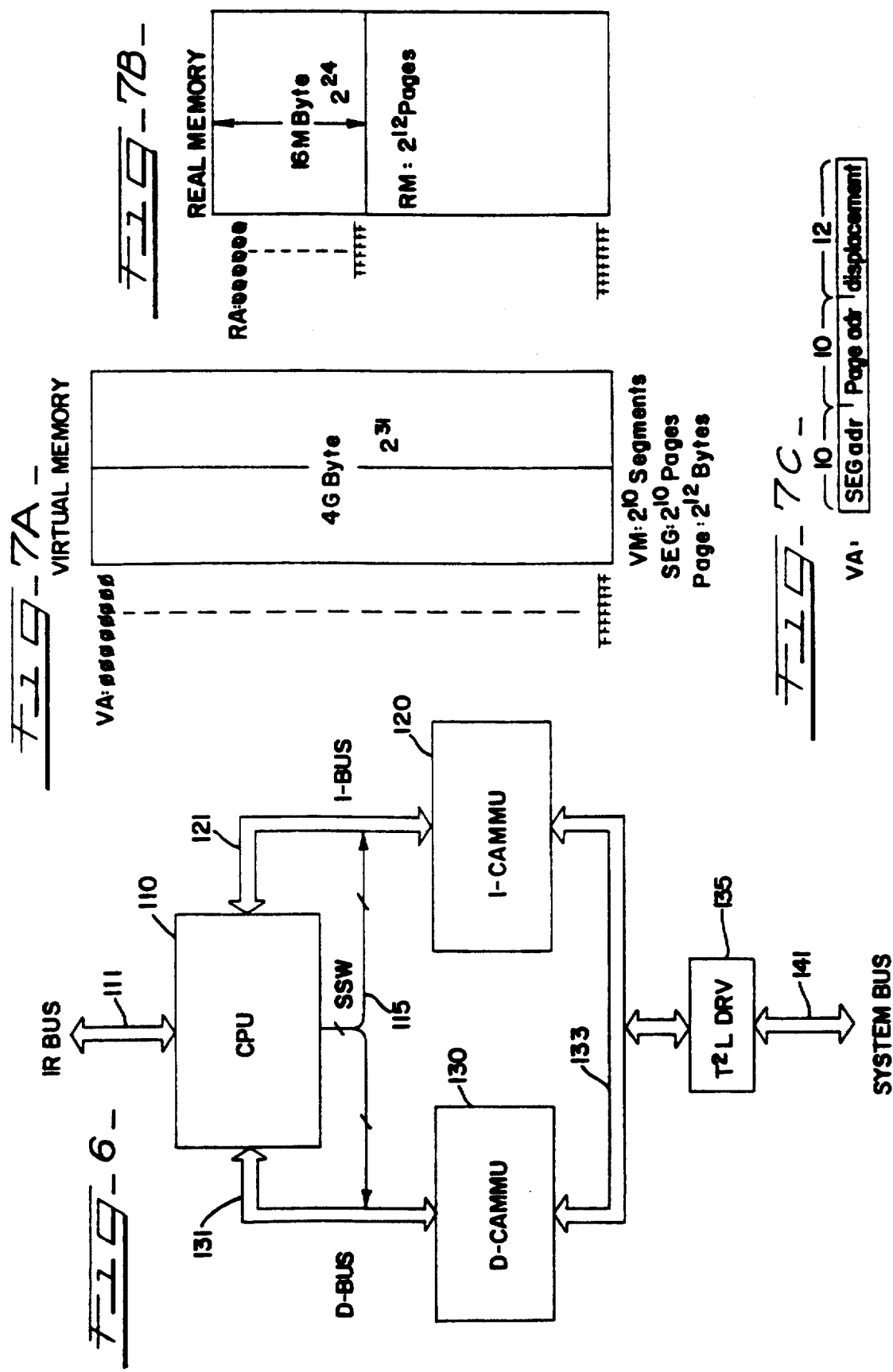

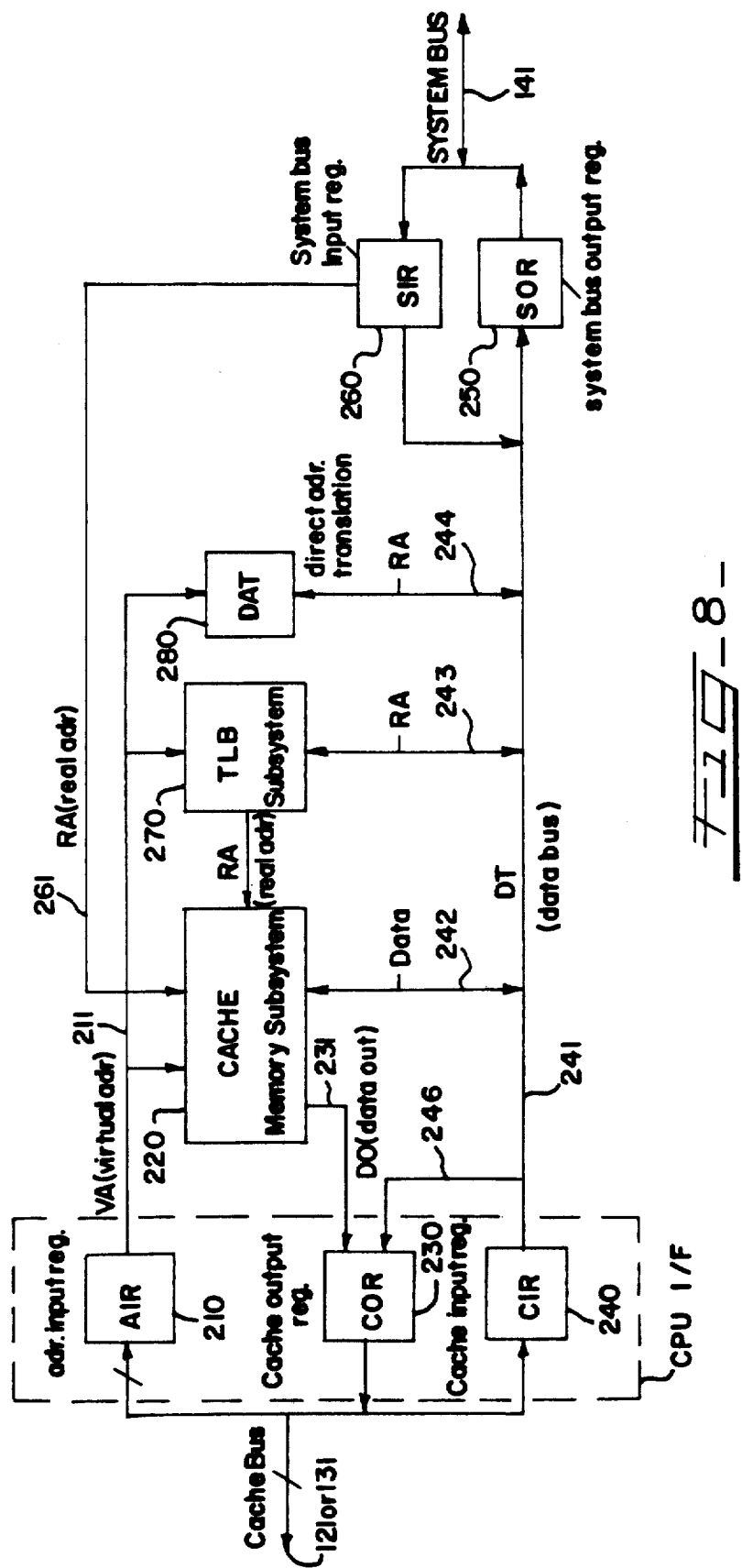

TLB SUBSYSTEM

HTLB

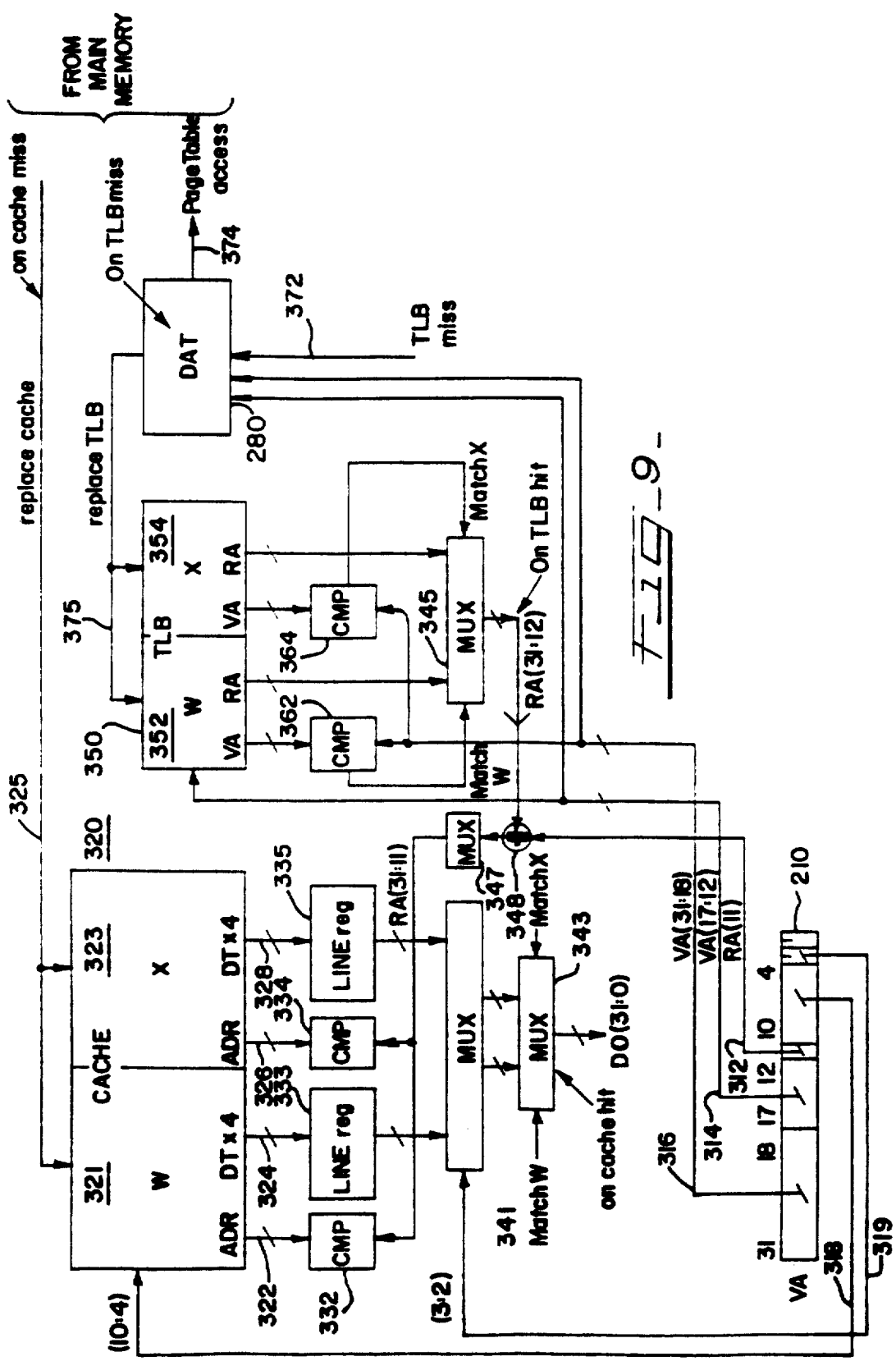

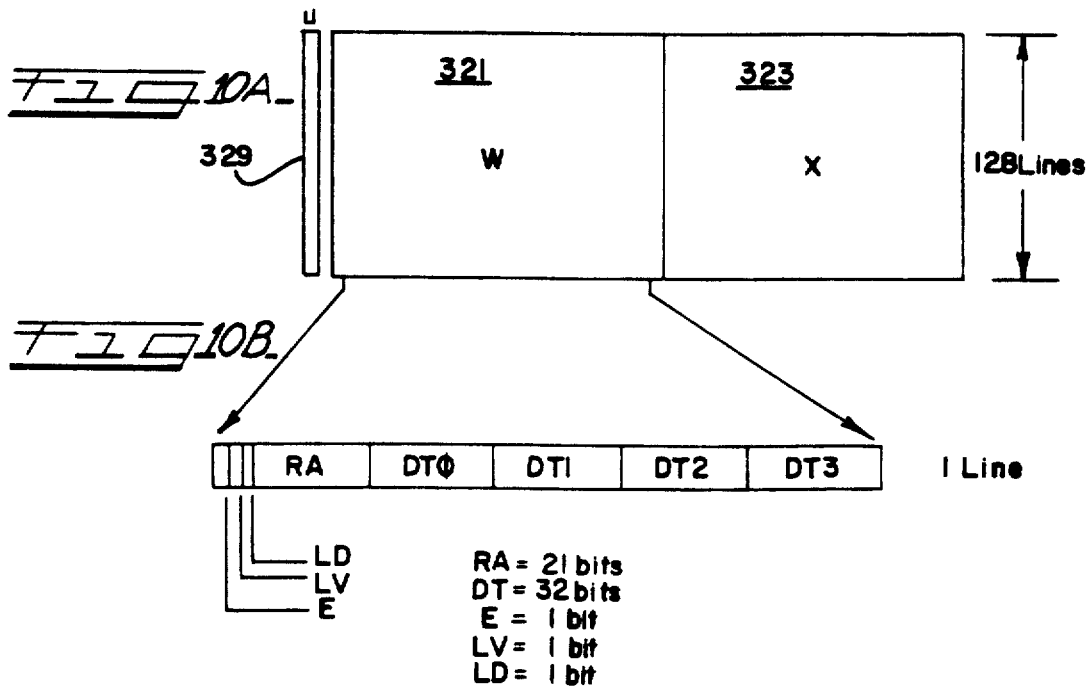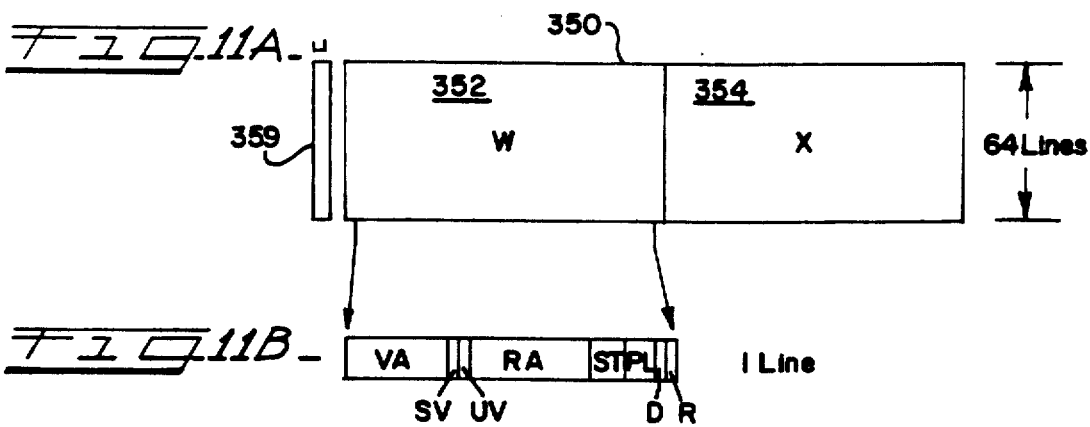

FIG.-12-
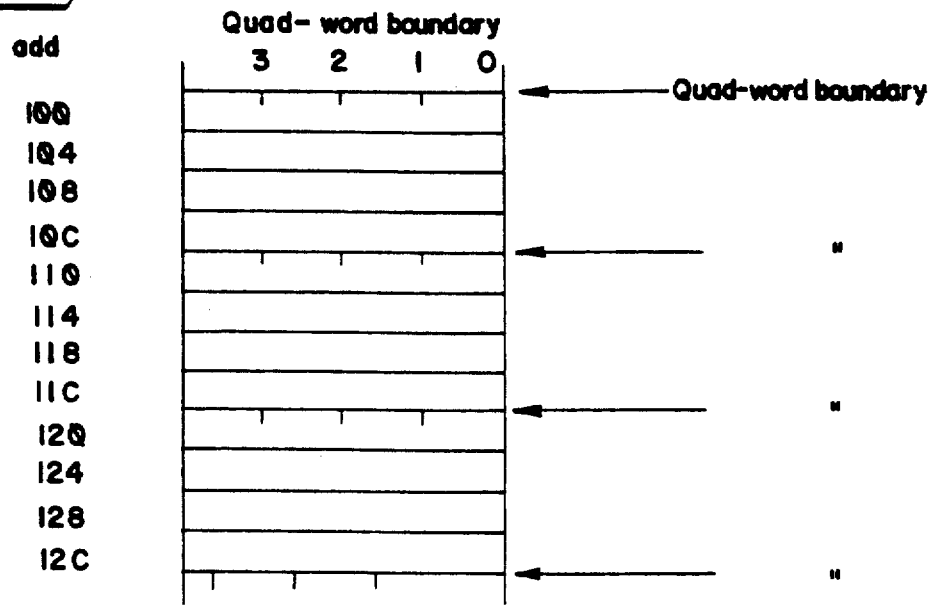
FIG.-13-
| PAGE 0 | VECTORS | 0000 0000 |
| --- | --- | --- |
| PAGE 1 | | |
| PAGE 2 | | |
| PAGE 3 | | |
| PAGE 4 | MM IO | |
| PAGE 5 | MM IO | |
| PAGE 6 | BOOT ROM | |
| PAGE 7 | BOOT ROM | |
| | | |
| PAGE 1,048,575 | | FFFFFFFF |
| VIRTUAL PAGE NO. | VIRTUAL ADD | REAL ADD | ST |
| --- | --- | --- | --- |
| 0 | 00000XXX | 00000XXX | 001XX |
| 1 | 00001XXX | 00001XXX | 001XX |
| 2 | 00002XXX | 00002XXX | 001XX |
| 3 | 00003XXX | 00003XXX | 001XX |
| 4 | 00004XXX | 00000XXX | 1X0XX |
| 5 | 00005XXX | 00001XXX | 1X0XX |
| 6 | 00006XXX | 00000XXX | 1X1XX |
| 7 | 00007XXX | 00001XXX | 1X1XX |

FIG_22

CAMMU CONTROL

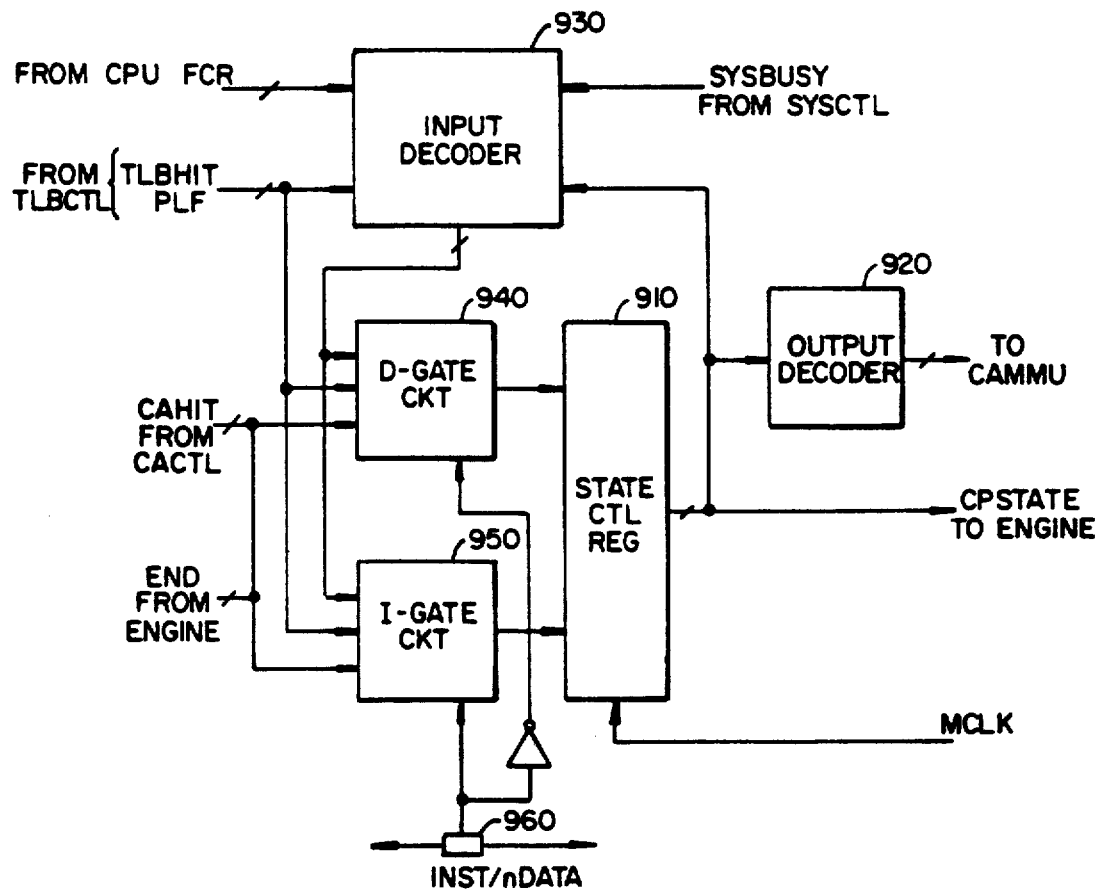
FIG_24_
CPU CONTROL

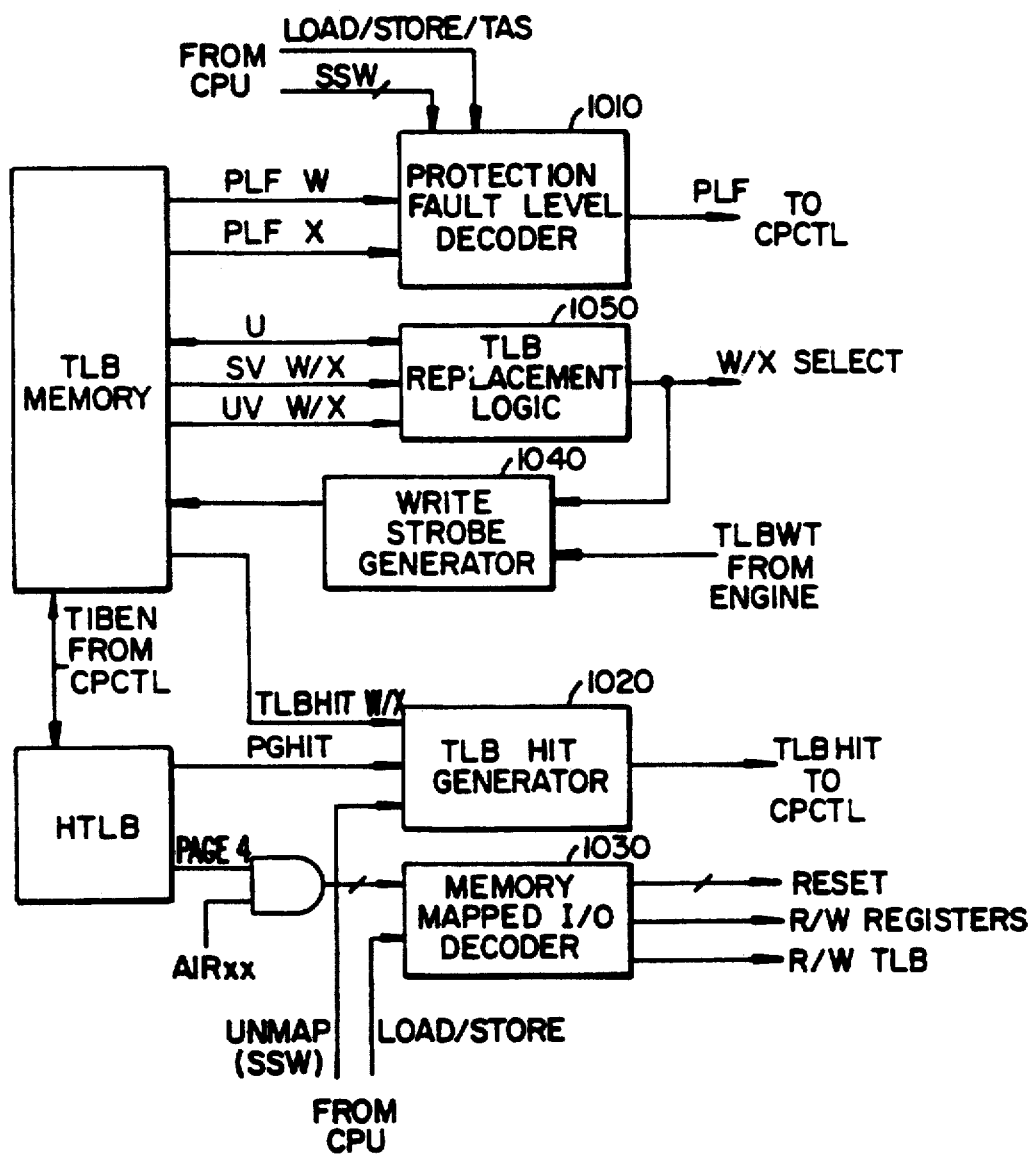

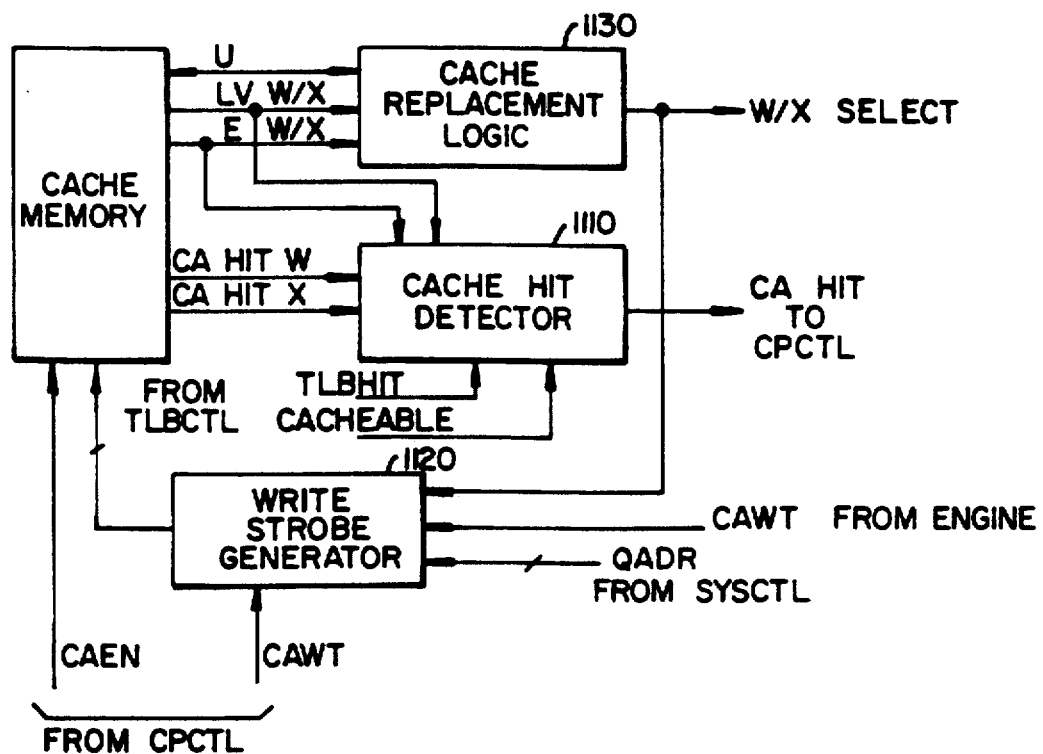
FIG_26_
CACHE CONTROL

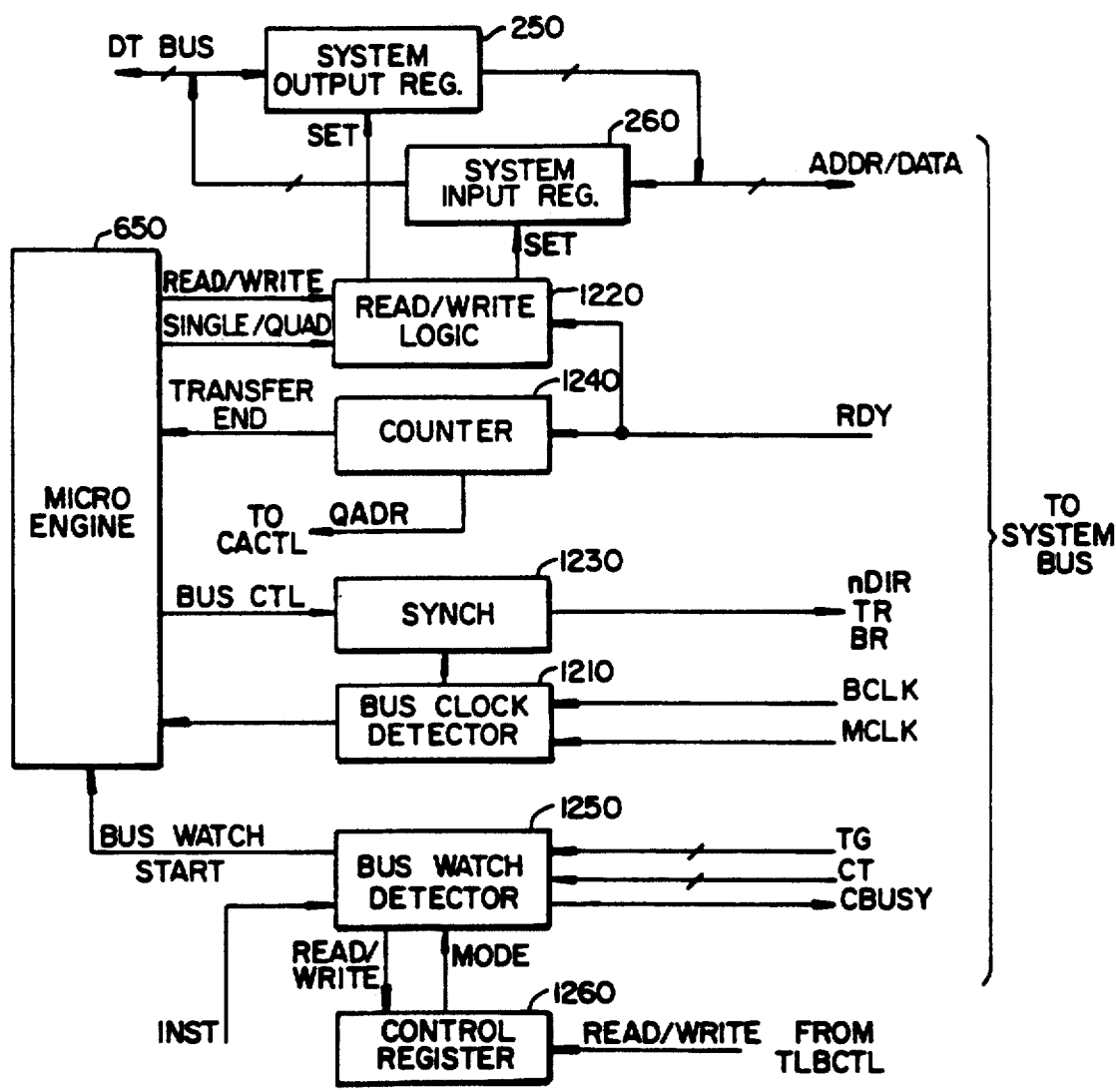
FIG_27_
SYSTEM BUS CONTROL

MEMORY ADDRESS TRANSLATION SYSTEM HAVING MODIFIABLE AND NON-MODIFIABLE TRANSLATION MECHANISMS This application is a continuation of application Ser. No. 06/915,094 filed Oct. 3, 1986, now abandoned, which was a continuation-in-part of application Ser. No. 06/794,090 filed Oct. 31, 1985, now abandoned, which was a continuation-in-part of application Ser. No. 06/704,497, filed Feb. 22, 1985, now abandoned.

BACKGROUND OF THE INVENTION

This invention relates to computer system architectures and more particularly to a cache memory management system architecture having a high-speed system bus, a very high speed microprocessor interface, a Hardwired Virtual to Real Address Translation lookaside Buffer Unit, and providing for individually determinable by page Cacheable/Non-cacheable selection.

Prior cache memory controllers and memory management systems have been developed along a number of partition lines. Prior art systems have utilized a cache controller, a cache memory, a memory management unit, and translation logic, each as separate partitioned units of the system architecture. In these systems, a CPU which would output an address requesting corresponding data for that address, or preparing to link data to the address corresponding to the output address. A cache controller in conjunction with a separate cache memory and possibly in conjunction with separate memory tables would resolve whether or not the output address corresponded to locations stored within the cache memory. If so, a hit was declared, and the cache controller would coordinate the reading or writing of data to the cache memory via the cache controller. If the data was not present, the cache controller would issue a miss signal back to the CPU. In this case, the prior art systems could either provide for the CPU to coordinate a main memory access to obtain the requested address location data, or the CPU could issue a request to a memory management unit to provide the requested location data. In the case of memory management being utilized, prior art systems provided limited register storage either in the CPU, in the memory management unit, or in main memory to assist in the translation process of virtual to physical address translation.

These prior art systems suffered from several drawbacks. First, due to the physical separation of the various units, overall data throughput rate was reduced because of bus loading and bus delays, and the multiple starting points for access via the cache controller, to the cache memory, or of a miss via the cache controller, cache memory, back to the CPU, to the memory management unit, and to main memory. Secondly, these systems burdened the CPU in the event of a cache miss. Additionally, in order to compensate for the cache controller circuitry in bus delays between the cache controller and cache memory, more expensive higher speed cache memories are required to obtain a cache access cycle time which is not delayed because of the cache controller and bus delay times. Furthermore, translation of virtual to real addresses required prior initialization and loading of page table directories and page tables, delaying access to Boot memory, mapped Input/Output space, etc.

SUMMARY

A cache, address translation and memory management system architecture and associated protocol is disclosed. The system is comprised of a two-way set associative memory cache subsystem, a two-way set associative translation logic memory subsystem, hardwired page translation, selectable access mode logic, and a selectively enablable instruction prefetch mode. The cache, address translation and memory management system includes a system interface and a processor/cache bus interface. The system interface provides means for coupling to a systems bus to which a main memory is coupled. The processor/cache bus interface provides means for coupling to an external CPU. The system can function as either an instruction cache or a data cache. As an instruction cache, the system provides instruction prefetch and on-chill program counter capabilities. As a data cache, the system provides an address register for receiving addresses from the CPU, to provide for transfer of a defined number of words of data commencing at the address as stored in the address register.

The cache address translation memory management system provides an integral architecture which provides the cache memory function, hardwired address translation (as well as read-write memory address translation from a virtual to a physical address), and page access protection facilities associated with the read-write memory address translation subsystem.

The cache memory management system provides selectable access modes. Thus, particular addresses can be defined by the CPU's system status word output which is coupled to the cache memory management systems to indicate various modes. These modes include mapped/unmapped, supervisors/users space access, cacheable/non-cacheable, etc. Additional features regarding the selectable access modes are defined by the page table entries which are loaded into the translation logic memory subsystem of the cache memory management system from the main memory page table at the time of loading of the cache memory subsystem with data from the page table in main memory. These page table defined selectable access modes include cacheable/non-cacheable, write-through/copy-back, supervisor/user mode, main memory versus Boot memory versus I/O space, etc.

The hardwired page translation system (TLB) provides guaranteed access for critical system and user defined addresses. Examples include an interrupt vector page, reserved pages for operating system and/or user applications, multiple I/O pages, and Boot pages. The hardwired TLB also provides selectable access modes via hardwired status data associated with the hardwired address translation logic, such as to select between real memory space, real Boot memory space, and real I/O space.

BRIEF DESCRIPTION OF THE DRAWINGS

These and other features and advantages of the present invention will become apparent from the following detailed description of the drawings, wherein:

FIG. 5 illustrates the system bus to cache interface of FIG. 4 in greater detail;

FIG. 6 is an electrical diagram illustrating the drivers/receivers between the instruction cache-MMU and the system bus;

FIGS. 7A-C illustrate the virtual memory, real memory, and virtual address concepts as utilized with the present invention;

FIG. 8 illustrates an electrical block diagram of a cache memory management unit;

FIG. 9 is a detailed block diagram of the cache memory management unit of FIG. 8;

FIGS. 10A-B illustrate the storage structure within the cache memory subsystem 320;

FIGS. 11A-B illustrate the TLB memory subsystem 350 storage structure in greater detail;

FIG. 12 illustrates the cache memory quadword boundary organization;

FIG. 13 illustrates the hardwired virtual to real translations provided by the TLB subsystem;

FIG. 24 illustrates CPU control circuit 810 of FIG. 23 in greater detail;

FIG. 25 illustrates TLB control circuitry 820, TLBCTL, of FIG. 23 in greater detail;

FIG. 26 illustrates the cache control circuit 830, CACTL, of FIG. 23 in greater detail; and FIG. 27 illustrates the System Bus control circuit 840, SYSCTL, of FIG. 23 in greater detail.

DETAILED DESCRIPTION OF THE DRAWINGS

Figure 1:
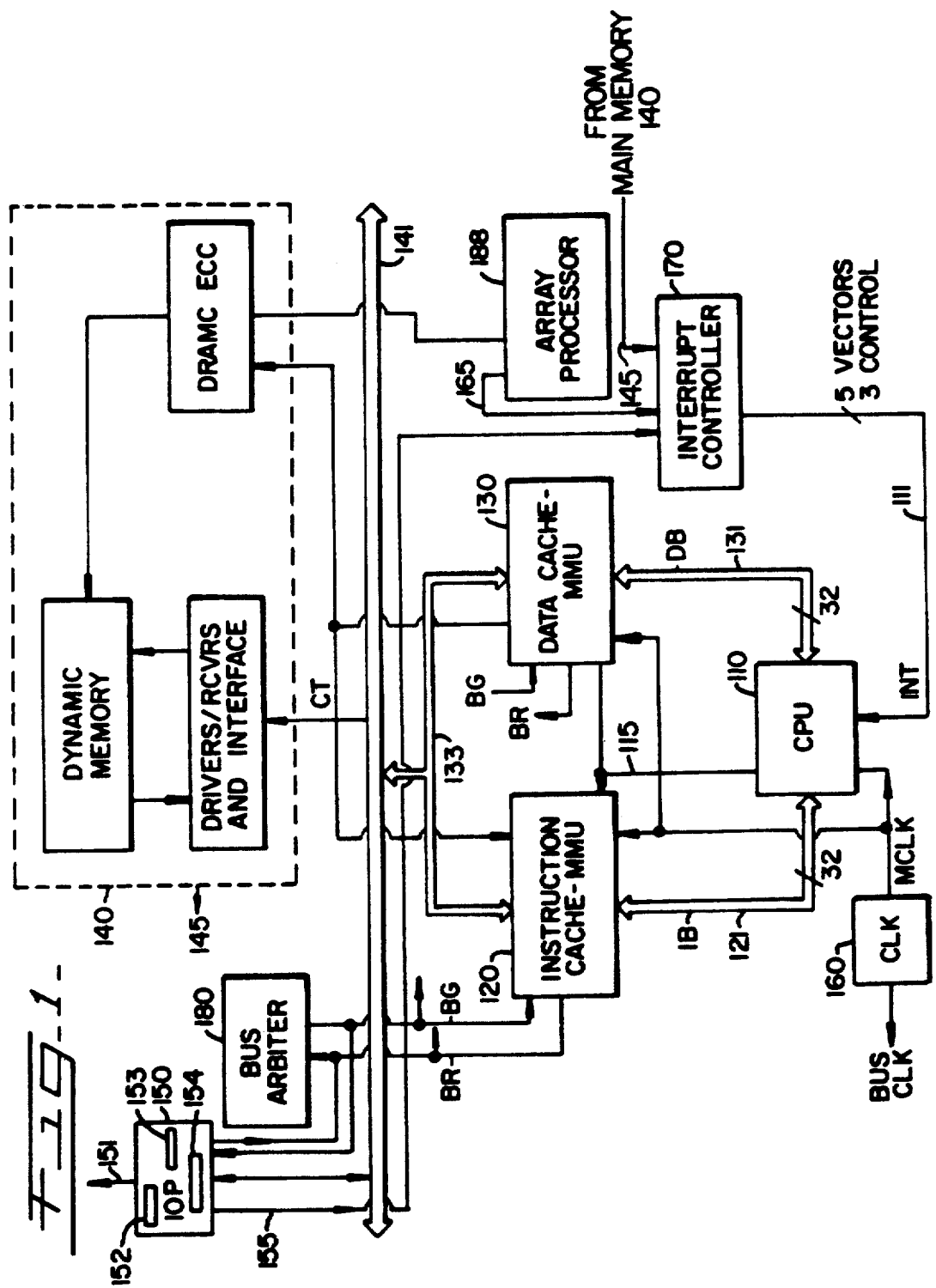
FIG. 1 illustrates a block diagram of a microprocessor-based dual cache/dual bus system architecture in accordance with the present invention.

Referring to FIG. 1, a system embodiment of the present invention is illustrated. A central processing unit 110 is coupled via separate and independent very high speed cache/processor buses, an instruction bus 121 and a data bus 131, coupling to an instruction cache-memory management unit 120 and a data cache-memory management unit 130, respectively, each having an interface to main memory 140 through system bus 141. Main memory 140 contains the primary storage for the system, and may be comprised of dynamic RAM, static RAM, or other medium to high speed read-write memory. Additionally, a system status bus 115 is coupled from the CPU 110 to each of the instruction cache-memory management unit 120 and data cache-memory management unit 130.

Additionally, as illustrated in FIG. 1, other system's elements can be coupled to the system bus 141, such as an I/O processing unit, IOP 150, which couples the system bus 141 to the I/O bus 151. The I/O bus 151 may be a standard bus interface, such as Ethernet, Unibus, VMEbus or Multibus. I/O bus 151 can couple to the secondary storage or other peripheral devices, such as hard disks, floppy disks, printers, etc. Multiple IOPs can be coupled to the system bus 141 and thereby can communicate with the main memory 140.

The CPU 110 is also coupled via interrupt lines 111 to an interrupt controller 170. Each of the units contending for interrupt priority to the CPU has separate interrupt lines coupled into the interrupt controller 170. As illustrated in FIG. 1, the array processor 188 has an interrupt output 165 and the IOP 150 has an interrupt output 155. Controller 170 prioritizes and arbitrates priority of interrupt requests to the CPU 110.

A system clock 160 provides a master clock MCLK to the CPU 110, instruction cache-memory management unit 120 and data cache-memory management unit 130 for synchronizing operations. In addition, a bus clock BCLK output from the system clock 160, provides bus synchronization signals for transfers via the system bus 141, and is coupled to all system elements coupled to the system bus 141.

Where multiple devices request access to the system bus 141 at the same time, a bus arbitration unit unit 180 is provided which prioritizes access and avoids collisions.

Figure 2:
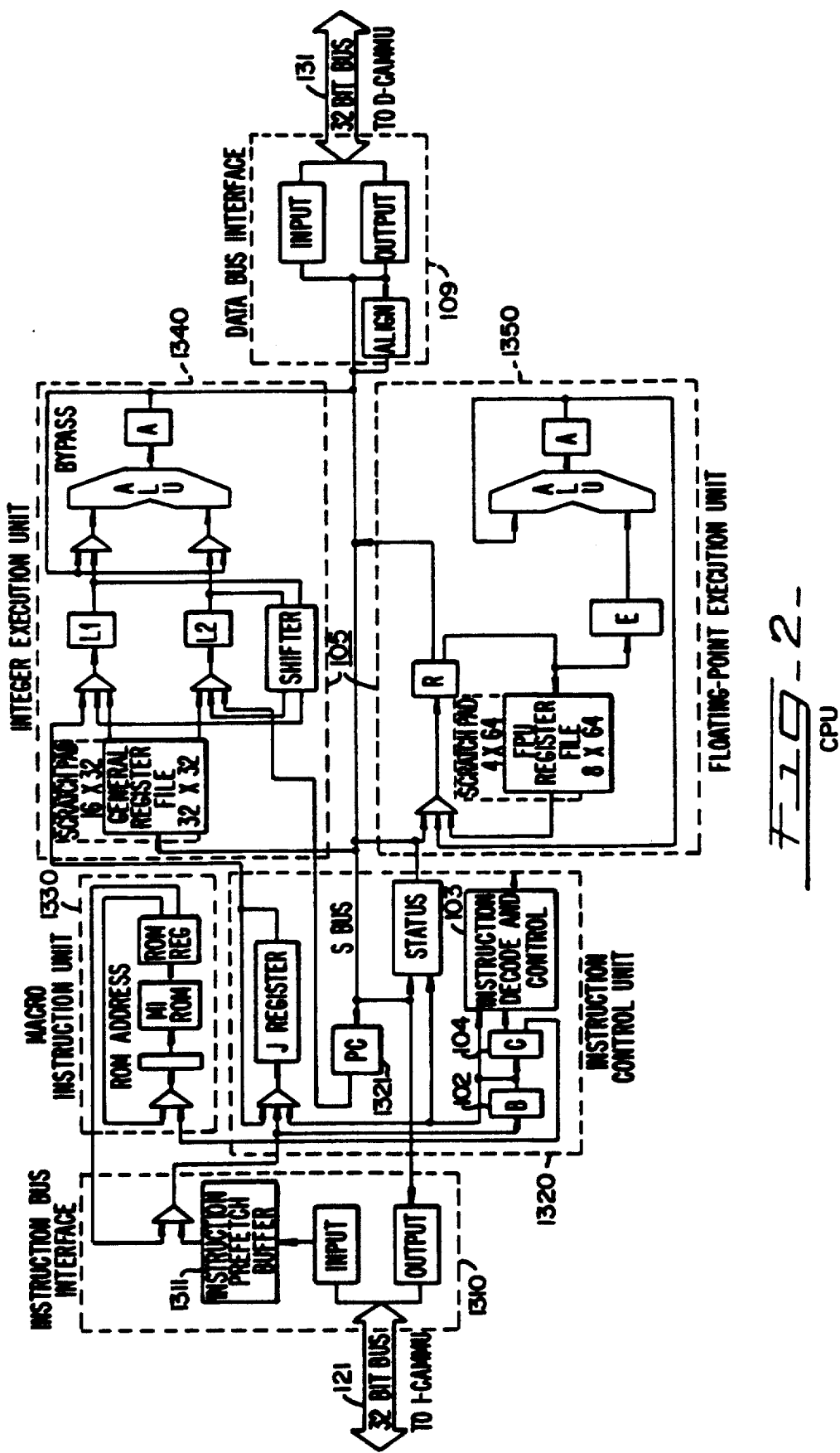
FIG. 2 shows CPU 110 of FIG. 1 in more detail.

FIG. 2 shows CPU (processor) 110 in greater detail. Instructions from instruction cache-MMU 120 enter from instruction bus 121 to instruction bus interface unit 1310 where they are held in prefetch buffer 1311 until needed for execution by instruction control unit 1320. Instructions are also supplied as needed from macro instruction unit 1330 which holds frequently used instruction sequences in read only memory. Instructions first enter register 102 and then register 104 (instruction registers B and C, respectively) which form a two stage instruction decoding pipeline. Control signals from instruction decoder 103 are timed and gated to all parts of the processor for instruction execution. For speed of execution, instruction decoder 103 is preferably implemented in the form of sequential state machine logic circuitry rather than slower microcoded logic circuitry. Program counter 1321 contains the address of the instruction currently being executed in instruction register C. The execution unit 105, comprising integer execution unit 1340 and floating point execution unit 1350, executes data processing instructions. Data is received from and transmitted to data cache-MMU 130 over data cache-MMU bus 131 through data bus interface 109.

Instruction interface 1310 of processor 110 includes a multi-stage instruction buffer 1311 which provides means for storing, in seriatim, a plurality of instruction parcels, one per stage. A cache advance signal ISEND is sent by the instruction interface as it has free space. This signals instruction cache-MMU 120 to provide an additional 32-bit word containing two 16-bit instruction parcels via instruction bus 121. This multi-stage instruction buffer increases the a the average instruction throughput rate.

Responsive to the occurrence of a context switch or branch in the operation of the microprocessor system, instruction interface 1310 selectively outputs an instruction address for storage in an instruction cache-MMU 120 program counter. A context switch can include a trap, an interrupt, or initialization. The cache advance signal provides for selectively incrementing the instruction cache-MMU program counter, except during a context switch or branch.

Figure 3:
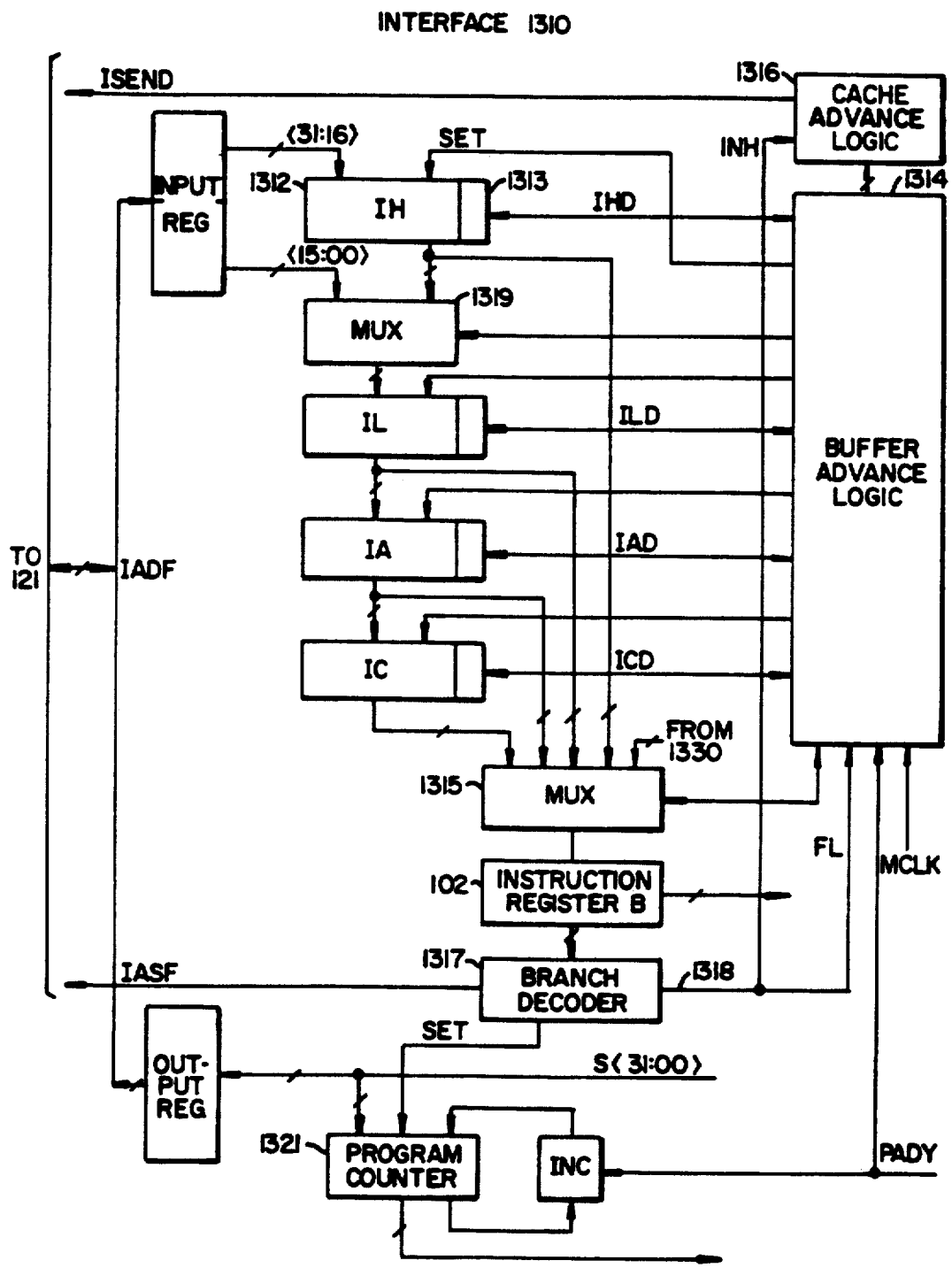
FIG. 3 shows the CPU instruction bus interface of FIG. 2 in more detail.

In FIG. 3, prefetch buffer 1311 is shown in detail, comprising the four prefetch buffer register stages IH, IL, IA and IC. The IH register stage holds a 16-bit instruction parcel in register 1312 plus an additional bit of control information in register 1313, IHD, which bit is set to indicate whether IH currently contains a parcel. Each of the register stages is similarly equipped to contain an instruction parcel and an associated control bit. Buffer advance logic circuit 1314 administers the parcel and control bit contents of the four register stages. In response to the parcel advance control signal PADV from instruction decoder 103, buffer advance logic circuit 1314 gates the next available instruction parcel into instruction register 102 through multiplexor 1315, and marks empty the control bit associated with the register stage from which the parcel was obtained. In response to the control bits of the four stages, circuit 1314 advances the parcels to fill empty register stages. As space becomes available for new instruction parcels from the instruction cache-MMU, cache advance logic circuit 1316 responds to the control bits to issue the ISEND signal on instruction bus 121. Instruction cache-MMU responds with a 32-bit word containing two parcels. The high order parcel is received in IH, and the low order parcel in IL through multiplexor 1319.

On each MCLK cycle both the buffer advance and cache advance circuits attempt to keep the prefetch buffer stages full as conditions permit. The buffer advance arid cache circuits are implemented in combinational logic in a manner that is evident to those skilled in the art. For example, cache advance circuit 1316 produces ISEND in response to the negation of the following boolean logic expression:

(ICD,IAD,ILD+ICD,IAD,IHD+ICD,ILD,IHD-+IAD,ILD,IHD).

The first two terms indicates that IA and IC are full with either IH or IL full. The last two terms indicate that IL and IH are full with either IC or IA full. In all of these cases, there is no available register space in the prefetch buffer, while in all other cases, there is space.

Instruction parcels stored in instruction register 102 are partially decoded before being sent to instruction register 104 to complete the decoding process. Decoding of branch instructions is done by branch decoder 1317, a part of decoder 103, in response to instruction register 102. In the case of a branch instruction, the branch address is set into program counter 1321 from the processor S bus, cache advance circuit 1316 is inhibited from sending ISEND and the prefetch buffer is flushed (signal path 1318). Branch decoder 1317 instead sends IASF to the instruction cache-MMU. This causes instruction cache-MMU 120 to take the new branch address from cache bus 121.

The MCLK is the clock to the entire main clock, (e.g. 33 MHz), logic. BCLK is the system bus clock, preferably at either ½ or ¼ of the MCLK.

For the system bus 141 synchronization, BCLK is delivered to all the units on the system bus, i.e. IOPS, bus arbiter, caches, interrupt controllers, the main memory and so forth. All signals must be generated onto the bus and be sampled on the rising edge of BCLK. The propagation delay of the signals must be within the one cycle of BCLK in order to guarantee the synchronous mode of bus operation. The phase relationships between BCLK and MCLK are strictly specified. In one embodiment, BCLK is a 50% duty-cycle clock of twice or four times the cycle time of MCLK, which depends upon the physical size and loads of the system bus 141.

As illustrated in FIG. 1, the transfer of instructions is from the instruction cache-MMU 120 to the processor 110. The transfer of data is bidirectional between the data cache-MMU 130 and processor 110. Instruction transfer is from the main memory 140 to the instruction cache-MMU 120. Instruction transfer occurs whenever an instruction is required which is not resident in the cache memory of instruction cache-MMU 120. The transfer of data between the data cache-MMU 130 and main memory 140 is bidirectional. The memory management units of the instruction cache-MMU 120 and data cache-MMU 130 perform all memory management, protection, and virtual to physical address translation.

As illustrated in FIGS. 1, 7A-C, and 8, the processor 110 provides virtual address outputs which have a mapped relationship to a corresponding physical address in main memory. The memory management units of the instruction and data cache-MMUs 120 and 130 are responsive to the respective virtual address outputs from the instruction and data interfaces of the processor 110, such that the memory management units selectively provide physical address and the associated mapped digital information for the respective virtually addressed location. When the requested information for the addressed location is not stored in the respective cache-MMU memories (i.e. a cache miss), the micro engine of the cache-MMUs provides a translated physical address for output to the main memory 140. The corresponding information is thereafter transferred from the main memory 140 to the respective instruction cache-MMU 120 or to or f rom the data cache-MMU 130, and as needed to the processor 110.

Figure 4:
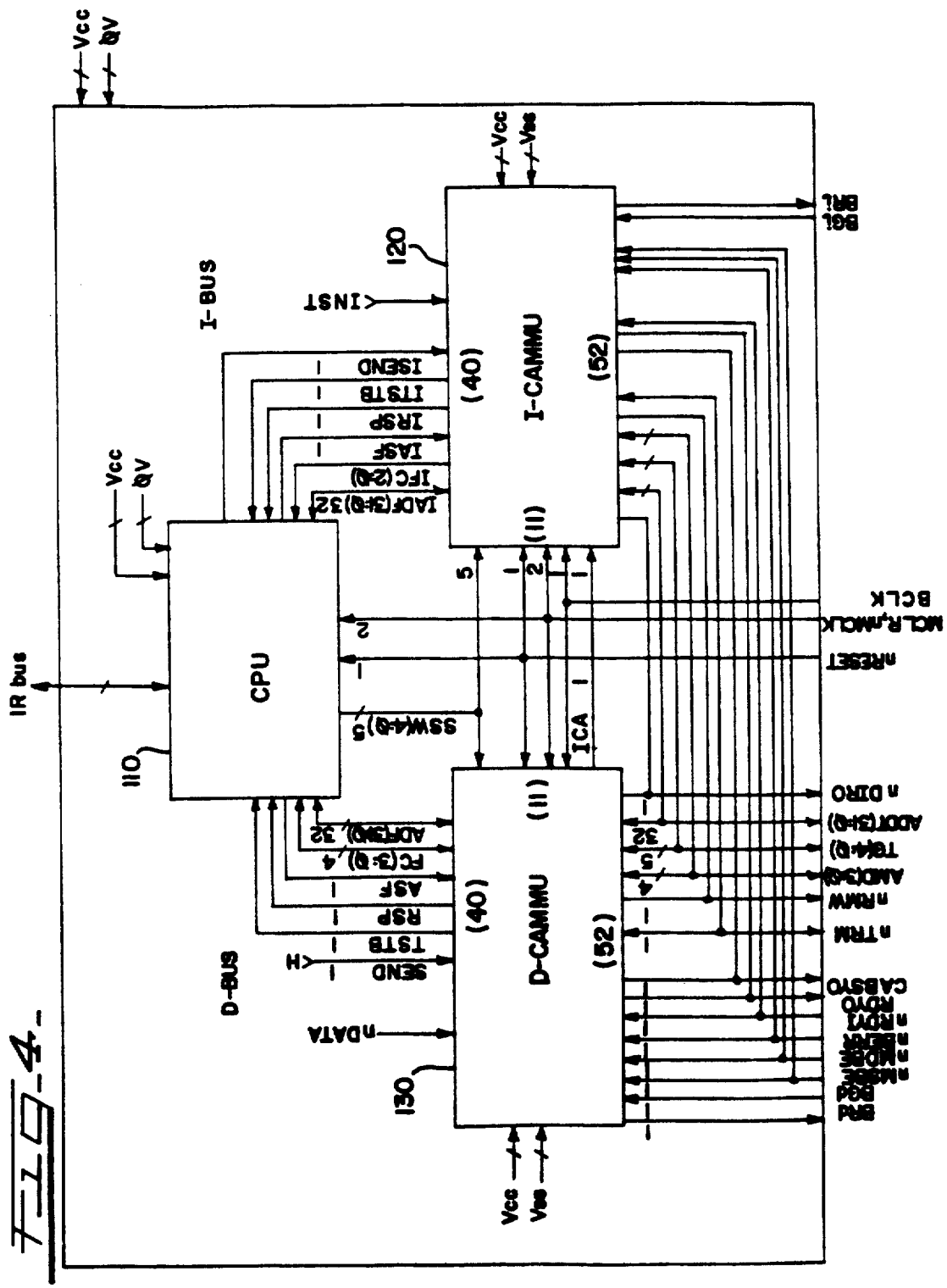
FIG. 4 is an electrical diagram illustrating the instruction cache/processor bus, the data cache/processor bus, and the system bus.

The two separate cache interface buses, the instruction bus 121 and the data bus 131 are each comprised of multiple signals. As illustrated in FIGS. 4 and 5, for one embodiment, the signals on and the data cache bus 131, the instruction cache bus 121 are as follows:

** DATA CACHE BUS **

ADF<31:0>: address/data bus

These lines are bidirectional and provide an address-/data multiplexed bus. The CPU puts an address on these lines for one clock cycle. On store operations, the address is followed by the data. On load or TAS (i.e. test and set) operations, these bus lines become idle (floating) after the address cycle, so that these lines are ready to receive data from the Data Cache-MMU. The Data Cache-MMU then puts the addressed data on the lines.

FC<3:0>: function code/trap code

The CPU puts "the type of data transfer" on FC<3:0> lines for one clock cycle at the address cycle. The D-CACHE, or I-CACHE, sends back "the type of trap" on abnormal operations along with TSTB (i.e. Trap Strobe Signal).

| | Transfer type | | | |
|---|---|---|---|---|
| (On ASF Active) | | | | |
| FC < 3 | 2 | 1 | 0 > | |
| 0 | 0 | 0 | 0 | load singleword mode |
| 0 | 0 | 0 | 1 | load doubleword mode |
| 0 | 0 | 1 | 0 | load byte |
| 0 | 0 | 1 | 1 | load halfword |
| 0 | 1 | 0 | 0 | Test and set |
| 1 | X | 0 | 0 | store singleword |
| 1 | X | 0 | 1 | store doubleword |
| 1 | X | 1 | 0 | store byte |
| 1 | X | 1 | 1 | store halfword |

The D-cache puts the TRAP code on FC to respond to the CPU.

| | Trap Code | | | |
|---|---|---|---|---|
| (on TSTB active) | | | | |
| FC < 3 | 2 | 1 | 0 > | |
| X | 0 | 0 | 0 | |
| X | 0 | 0 | 1 | memory error (MSBE) |
| X | 0 | 1 | 0 | memory error (MDBE) |
| X | 0 | 1 | 1 | |
| X | 1 | 0 | 0 | |
| X | 1 | 0 | 1 | page fault |
| X | 1 | 1 | 0 | protection fault (READ) |
| X | 1 | 1 | 1 | protection fault (WRITE) |

ASF: address strobe

ASF is activated by the CPU indicating that the 'address' and 'type of data transfer' are valid on ADF<31:10> and FC<3:0> lines, respectively. ASF is activated one half a clock cycle prior to the address being activated on the ADF bus.

RSP: response signal

On load operations, the RSP signal is activated by the D-cache indicating that data is ready on the ADF bus. RSP is at the same timing as the data on the ADF bus. The D-cache sends data to CPU on a load operation.

On store operations, RSP is activated when the data cache-MMU becomes ready to accept the next operation.

On load-double, RSP is sent back along with each data parcel transfer.

On store-double, only one RSP is sent back after the second data parcel is accepted.

TSTB: TRAP strobe

TSTB, along with the trap code on FC<2:0>, is sent out by the D-cache indicating that an operation is abnormally terminated, and that the TRAP code is available on FC<2:0> lines. On an already-corrected error (MSBE), TSTB is followed by RSP after two clock intervals whereas on any FAULTs or on a non-correctable ERROR (MDBE), only TSTB is sent out.

nDATA: D-cache

Low on this line defines the operation of this cache-MMU as a data cache-MMU.

*** INST bus ***

IADF<31:0>: address/instruction bus

These lines are bidirectional, and form an address/instruction multiplexed bus. The CPU sends out a virtual or real address on these lines when it changes the flow of the program such as Branch, RETURN, Supervisor Call, etc., or when it changes SSW<30:26> value. The instruction cache-MMU returns instructions on these lines.

IFC<3:0> function code/response code

The I-cache puts the TRAP code on the PC lines to respond to the CPU.

| IFC (at ITSTB active) | | | | |
|---|---|---|---|---|
| 3 | 2 | 1 | 0 | |
| X | 0 | 0 | 0 | |
| X | 0 | 0 | 1 | memory error (MSBE) |
| X | 0 | 1 | 0 | memory error (MDBE) |
| X | 0 | 1 | 1 | |
| X | 1 | 0 | 0 | |
| X | 1 | 0 | 1 | page fault |
| X | 1 | 1 | 0 | protection fault (execution) |
| X | 1 | 1 | 1 | |

IASF: address strobe

IASF is activated by the CPU, indicating that the address is valid on IADF<31:0> lines. IASF is active half a clock cycle earlier than the address is on the IADF bus.

ISEND: send instruction (i.e. cache advance signal)

ISEND is activated by the CPU, indicating that the CPU is ready to accept the next instruction (e.g. the instruction buffer in CPU is not full).

At the trailing edge of RSP, ISEND must be off if the instruction buffer is full, otherwise the next instructions will be sent from the instruction cache-MMU. When the new address is generated, on Branch for example, ISEND must be off at least one clock cycle earlier than IASF becomes active.

IRSP: response signal

IRSP is activated by the I-cache, indicating an instruction is ready on the IADF<31:0> lines. IRSP is at the same timing as the data on the bus.

ITSTB: TRAP strobe

This is activated by the I-cache, indicating that the cache has abnormally terminated its operation, and that a TRAP code is available on IFC<3:0> lines. On an already-corrected error (MSBE), TSTB is followed by RSP after two clock intervals, whereas on FAULTs or a non-correctable ERROR (MDBE), only TSTB is sent out and becomes active.

INST: I-cache

A high on this line defines the operation of this cache-MMU as an instruction cache-MMU.

** SYSTEM STATUS BUS **

MPUO: SSW30, supervisor mode

MPK: SSW29, protection key

MPUOU: SSW28, selecting a user's data space on supervisor mode

MPKU: SSW27, protection key of a user's data space on supervisor mode

MPM: SSW26, virtual mapped.

These signals represent the System Status Word (SSW <30:26>) in the CPU and are provided to both the D-cache and I-cache.

Each of the instruction cache-MMU 120 and data cache-MMU 130 has a second bus interface for coupling to the system bus 141. The system bus 141 communicates information between all elements coupled thereto. The bus clock signal BCLK of the system clock 160 provides for synchronization of transfers between the elements coupled to the system bus 141.

As shown in FIGS. 5 and 6, the system bus output from the instruction cache-MMU 120 and data cache-MMU 130 are coupled to a common intermediate bus 133 which couples to TTL driver/buffer circuitry 135 for buffering and driving interface to and from the system bus 141. This is particularly useful where the instruction cache-MMU 120 and data cache-MMU 130 are mounted on one module, and where it is desirable to reduce the number of signals and protect the monolithic integrated circuits from bus interface hazards. The following bus signals coordinate bus driver/receiver activity:

DIRout: direction of the AD bus is outward

This signal is used to control off-chip drivers-receivers of the AD lines. The master cache activates this signal on generating the ADDRESS, and on sending out DATA on the write mode. The slave cache activates this signal on sending out the DATA on the read mode.

ICA/: I-cache access

NICA is sent from the D-cache to the paired I-cache for accessing the I/O space in the I-cache. Upon the arrival of an I/O access from the system bus, the I-cache accepts it as an I/O command only when the NICA is active. Thus, the caches accept I/O commands only from the paired CPU.

Synchronous operation of the system bus 141 is made possible in the above described system environment so long as no signal change occurs at the moment it is sampled. Two timings are fundamental to realize this operation, one is for generating signals on the bus and the other is for sampling to detect signals. These two timings must be generated from the Bus Clock BCLK which has a certain phase relationship with the Master Clock MCLK, to maintain the certain relationship with internal logic operation. These timings must have a small skew from one unit to the other on the bus to satisfy the following equation.

$$Tg\text{-}s < Tpro + Tsk$$

where, Tg-s is the time period from the signal generating timing to the signal sampling timing, Tpro is the maximum propagation delay time of signals, and Tsk is the skew of the bus clock.

If the physical requirements of the system bus do not satisfy the above equation, the signals will arrive asynchronously with respect to the sampling timing. In this case, a synchronizer is required in the bus interface to synchronize the external asynchronous signals. Although the asynchronous operation does not restrict the physical size of the bus or any kinds of timing delay, a serious drawback exists in that it is extremely difficult to eliminate the possibility of a "synchronize fault". Another disadvantage of the asynchronous scheme is a speed limitation due to the handshake protocol which is mandatory in asynchronous schemes. This is especially inefficient in a multi-data transfer mode. Although a handshake scheme is a useful method of inter-communication between one source and one or more destinations, and although this is a safe way for data transfer operation, the timing protocol restricts the speed and is sometimes unsatisfactory in very fast bus operations. Additionally, an asynchronous bus is also sensitive to noise.

In the preferred embodiment, the system bus 141 has one clock: BCLK. BCLK is used to generate the synchronous timings of bus operation as described above.

The system bus can provide the combinations of handshake and non-handshake schemes.

In a preferred embodiment, the system bus 141 is a high speed, synchronous bus with multiple master capability. Each potential master can have separate interrupt lines coupled to an interrupt controller 170 coupled via control lines Ill to the processor 110. The system bus 141 has a multiplexed data/address path and allows single or multiple word block transfers. The bus is optimized to allow efficient CPU-cache operation. It has no explicit read/modify/write cycle but implements this by doing a read then write cycle without releasing the bus.

As an illustration of an exemplary embodiment of FIG. 1, the system includes a single CPU 110, a fixed priority bus arbiter 180 and an interrupt controller 170. All signals are generated and sampled on a clock edge and should be stable for at least a set up time before the next clock edge and be held constant for at least a hold time after the clock edge to avoid indeterminate circuit operation. This means that there should be limitations placed on bus delays which will in turn limit bus length and loading.

The system bus 141 is comprised of a plurality of signals. As illustrated in FIG. 5, for one embodiment, the system bus 141 can be comprised of the following signals, where "/" indicates a low true signal.

AD<31:0>: address/data bus

This is the multiplexed address/data bus. During a valid bus cycle, the bus master with the right of the bus puts an address on the bus. Then that bus master either puts data on the bus for a write, or three-state (floats) its AD bus outputs to a high impedance state to prepare to receive data during a read.

CT<3:0>: CycleType

CT<3:2> indicates the type of master on the bus and whether a read or write cycle is occurring.

| 3 | 2 | | |
|---|---|---|---|
| 0 | 0 | -------- | CPU write (write issued by a CPU type device) |
| 0 | 1 | -------- | CPU read (read issued by a CPU type device) |
| 1 | 0 | -------- | I/O write (write issued by an IOP type device) |
| 1 | 1 | -------- | I/O read (read issued by an IOP type device) |

CT(1:0) indicates the number of words to be transferred in the cycle.

| CT<1:0> | | | |
|---|---|---|---|
| 0 | 0 | -------- | a singleword transfer |
| 0 | 1 | -------- | a quadword transfer |
| 1 | 0 | -------- | a 16-word transfer |
| 1 | 1 | -------- | Global CAMMU write |

MS<4:0>: System Memory Space bits

The system MS bits specify the memory space to which the current access will occur and the code which indicates that the cache will perform an internal cycle. That cycle is required to either update a cache entry or to supply the data to the system bus if a cache has a more recent copy of the data.

| MS : | 4 | 3 | 2 | |
|---|---|---|---|---|
| | 0 | 0 | 0 | Main Memory, private space. Cacheable, write-through. |
| | 0 | 0 | 1 | Main memory, shared space. Cacheable, write-through. |
| | 0 | 1 | 0 | Main memory, private space, Cacheable. Copy-back |
| | 0 | 1 | 1 | Main memory, shared space. Not cacheable. |
| | 1 | X | 0 | Memory-mapped I/O space. Not cacheable. |
| | 1 | X | 1 | Boot loader space. Not cacheable. |

A transfer between a cache-MMU and a device in memory mapped space is by single or partial word only.

If the transfer is to memory mapped I/O space, it will be of the single cycle type, that is, CT(1:0) are (00), then the lower two MS bits indicate the size of the referenced data:

| MS | (1:0) | |
|---|---|---|
| 0 | X | Whole word transfer |
| 1 | 0 | Byte transfer |
| 1 | 1 | ½ word transfer |

The byte or halfword transferred must appear on the bus bits pointed to by the data's address. For example, during a byte access to address FF03 (H-EX), the desired data must appear on bus signals AD<23:16>, the third byte of the word.

When a cache, 120 or 130, is accessed by a Shared-Write (i.e. a write into shared space in main memory 140) or I/O write from the system bus, the hit line in the appropriate caches must be invalidated. When a cache is accessed by I/O read from the system bus, the matched dirty data in the cache must be sent out.

Masters must only issue to the slave the type(s) of cycle(s) that the slave is capable of replying to, otherwise the bus will time out.

AC/: ActiveCycle

This is asserted by the current bus master to indicate that a bus cycle is active.

RDY/: ReaDY

RDY/ is issued by the addressed slave when it is ready to complete the required bus operation and has either taken the available data or has placed read data on the bus. RDY/ may not be asserted until CBSY/ becomes inactive. RDY/ may be negated between transfers on multiple word access cycles to allow for long access times. During multiple word read and write cycles, ReaDY/ must be asserted two clocks before the first word of the transfer is removed. If the next data is to be delayed, ReaDY/ must be negated on the clock after it is asserted. This signal is "wired-ORed" between devices that can behave as slaves.

CBSY/: CacheBUSY

CBSY/ is issued by a cache when, due to a bus access, it is performing an internal cycle. The current controller of the bus and the addressed slave must not complete the cycle until CBSY has become false. This signal is "wire-ORed" between caches. The CBSY/ line is released only after the operation is over. On private-write mode, each slave cache keeps its CBSY/ signal in a high impedance state.

MSBE/: MemorySingleBitError

This is issued by main memory 140 after it has detected and corrected a single bit memory error. This will only go true when the data in error is true on the bus (i.e. if the third word of a four word transfer has had a corrected read error in this cycle, then during the time the third word is active on the bus (MMBE) will be true).

MMBE/: MemoryMultipleBitError

This is issued by main memory when it detects a non-correctable memory error. This will only go true when the data in error is true on the bus (i.e. if the third word of a four word transfer has an uncorrectable read error in this cycle then during the time the third word is active on the bus MMBE will be true).

BERR/: BusERRor

This is issued by the bus arbitration logic after it detects a bus time out condition or a bus parity error has been detected. The bus time out interval is the period of BusGrant.

P<3:0>: Parity bits 3 through 0

These are the four parity bits for the four bytes on the AD<31:0> bus. Both address and data have parity checked on all cycles.

PERR/: Parity ERRor

This is an open collector signal driven by each device's parity checker circuitry. It is asserted when a parity error is detected in either address or data. It is latched by the bus arbitration logic 180 which then generates a bus error sequence.

BRX: BusRequest

This is the bus request signal from device x to the bus arbiter 180.

BGX: BusGrant

This is the bus grant signal from the bus arbiter 180 to the device x.

LOCK/:

This is generated during a Read/Modify/Write cycle or a DAT operation.

MCLK: master clock

The master clock MCLK is delivered to the CPU or CPU's 110 and caches 120 and 130.

BCLK: BusClock

This is the system's bus clock. All signals are generated and sensed on its rising edge.

RESET/:

This is the system's master reset signal. It is asserted for a large number of bus clock cycles.

RATE: BCLK/MCLK rate

Low: BCLK has the frequency of ½ of the MCLK (e.g. 60 ns).

High: BCLK has the frequency of ¼ of the MCLK (e.g. 120 ns).

In one embodiment, the system architecture includes multiple cache memories, multiple processors, and I/O processors. In this embodiment, there is a problem in keeping the same piece of data at the same value in every place it is stored and/or used. To alleviate this problem, the cache memories monitor the system bus, inspecting each cycle to see if it is of the type that could affect the consistency of data in the system. If it is, the cache performs an internal cycle to determine whether it has to purge its data or to supply the data to the system bus from the cache instead of from the addressed device on the bus. While the cache is deciding this, it asserts CacheBuSY/. When it has finished the cycle, it negates CacheBuSY/. If it has the data, it places it on the bus and asserts ReaDY/.

The bus cycles that will cause the cache to do an internal cycle are:

1. An I/O read (IOR) to private memory space. This allows the cache to supply data, which may have been modified but has not yet been written into memory. The MemorySpace code is <010 xx>. That is, memory space is main memory, and the data required is cached in copy-back mode into a private memory area.

2. I/O write cycles (IOW) of one, four or sixteen words. This allows the cache to invalidate any data that it (they) contain which is to be changed in memory. The MemorySpace codes are <000xx>, <001xx> and <010xx>. That is, purge any matching data that is cached.

3. Single and four word CPU writes to shared memory. This allows other caches to invalidate any data they contain that is being changed in memory. The MemorySpace code is <001xx>. That is, any matching data that is cacheable and in shared memory areas.

4. Global writes to the cache memory management unit (CAMMU) control registers. In a multiple-CPU system, e.g. with multiple cache pairs, an additional device is required to monitor the CBSY line and issue the RDY signal when CBSY is off in the Global mode.

5. Accesses from the data cache memory management unit (DCAMMU) to its companion instruction cache memory management unit (ICAMMU).

The following is an exemplary summary of bus transfer requirements which should be followed to successfully transfer data across the system bus. Other restrictions due to software conventions may also be necessary.

1. All activity occurs on the rising edge of BCLK.
2. All signals must meet all appropriate set up and hold times.
3. Masters must only issue those cycles to slaves that the slaves can perform. These are:
    (i) MMIO and Boot accesses are single word only.
    (ii) Sixteen word transfers to memory may only be issued as I/O type cycles.
4. During not cacheable cycles, the addressed slave does not need to test for CacheBuSY/. If ReaDY/ is asserted, the memory system must abort its cycle.

A typical system bus 141 cycle starts when a device requests bus mastership by asserting BusRequest to the bus arbiter 180. Some time later, the arbiter 180 returns BusGrant indicating that the requesting device may use the bus. On the next clock, the device asserts ActiveCycle/, the bus address, the bus CycleType and the bus MemorySpace codes. The bus address is removed two BCLK's later. If the cycle is a write, then data is asserted on the AddressData lines. If it is a read cycle, the AddressData lines are three-stated in anticipation of data being placed on them. Then, one of the following will occur:

1. If the cycle involves a cache internal access, the cache (caches) will assert CacheBuSY/ until it (they) has (have) completed its (their) internal operations. CacheBuSY/ asserted inhibits the main memory from completing its cycle. There are now several possible sequences that may occur:

i. If the cycle is an I/O read to private memory and a cache has the most current data, the cache will simultaneously place the data on the system bus 141, assert ReaDY/ and negate CacheBuSY/. ReaDY/ going true indicates to the memory 140 that it is to abort the current cycle.

ii. If the cycle is an I/O write or a write to shared memory, the memory 140 waits for CacheBuSY/ to be negated and asserts ReaDY/.

iii. If the cycle is an I/O read to private memory in main memory 140, and the cache doesn't have the data, CacheBuSY/ is eventually negated. This enables the memory 140 to assert the data on the bus 141 and assert ReaDY/.

2. If the cycle doesn't involve a cache access, CacheBuSY/ need not be monitored.

ReaDY/ going true signals the master that the data has been transferred successfully. If a single word access, it indicates that the cycle is to end. ReaDY/ stays true until one BCLK after ActiveCycle/ is dropped. If it's a read cycle, then data stays true for one BCLK longer than ActiveCycle/. For a write cycle, data is dropped with ActiveCycle/. BusRequest, MemorySpace and CycleType are also dropped with ActiveCycle/. BusRequest going false causes the bus arbiter 180 to drop BusGrant on the next BCLK, ending the cycle. ReaDY/ is dropped with BusGrant. If the cycle is a multi-word type, then ReaDY/ going true indicates that further transfer will take place. The last transfer of a multiple word cycle appears identical to that of the corresponding single word cycle.

The Read/Modify/Write cycle is a read cycle and a write cycle without the bus arbitration occurring between them. The read data must be removed no later than the BCLK edge upon which the next ActiveCycle/ is asserted.

A BusError, BERR, signal is provided to enable the system bus 141 to be orderly cleared up after some bus fault condition. Since the length of the longest cycle is known (e.g. a sixteen word read or write), it is only required to time out BusGrant to provide sufficient protection. If, when a master, a device sees BusERRor it will immediately abort the cycle, drop BusRequest and get off the bus. BusGrant is dropped to the current master when BusERRor is dropped. Bus drive logic is designed to handle this condition. The address presented at the beginning of the last cycle that caused a bus time-out is stored in a register in the bus controller.

BERR is also generated when Parity ERRor/ goes true. If both a time out and Parity ERRor go true at the same time, time out takes precedence.

The main memory 140, as illustrated, is comprised of a read-write memory array error correction and drivers-receivers and bus interface circuitry which provide for bus coupling and interface protocol handling for transfers between the main memory 140 and the system bus 141. The main memory 140 memory error correction unit provides error detection and correction when reading from the storage of main memory 140. The error correction unit is coupled to the memory array storage of the main memory 140 and via the system bus 141 to the data cache-MMU 130 and instruction cache-MMU 120. Data being read from the memory 140 is processed for error correction by the error detection and correction unit.

The processor 110 provides addresses to indicate the starting location of data to be transferred from the cache-MMU's. In the preferred embodiment, this address information is provided in a virtual or logical address format which corresponds via an associative mapping to a real or physical address in the main memory 140. The main memory 140 provides for the reading and writing of data from addressable locations within the main memory 140 responsive to physical addresses as coupled via the system bus 141.

The very high speed cache memories of the instruction cache-MMU 120 and data cache-MMU 130 provide for the selective storage and output of digital information in a mapped associative manner from their respective addressable very high speed cache memories. The instruction cache-MMU 120 includes memory management means for managing the selective access to the primary main memory 140 and performs the virtual to physical address mapping and translation, providing, when necessary, the physical address output to the system bus 141 and therefrom to the main memory 140. The data cache-MMU 130 also has a very high speed cache memory responsive to virtual addresses as output from the processor 110. In a manner similar to the instruction cache-MMU, the data cache-MMU 130 has memory management means for managing the selective access to the main memory 140, the memory management means including virtual to physical address mapping and translation for providing, when necessary, a physical address output to the system bus 141 and therefrom to the primary memory 140 responsive to the virtual address output from the processor 110. The system bus 141 provides for high speed communications coupled to the main memory 140, the instruction cache-MMU 120, the data cache-MMU 130, and other elements coupled thereto, communicating digital information therebetween.

The CPU 110 can simultaneously access the two cache-MMU's 120 and 130 through two very high speed cache buses, instruction cache/processor bus 121 and the data cache/processor bus 131. Each cache-MMU accesses the system bus 140 when there is a "miss" on a CPU access to the cache-MMU. The cache-MMU's essentially eliminate the speed discrepancy between CPU 110 execution time and the Main Memory 140 access time.

The I/O Interface Processing Unit (IOP) 150 is comprised of an I/O adapter 152, an I/O processor unit 153 and a local memory MIO 154, as shown in FIG. 1. The I/O interface 152 interfaces the system bus 141 and an external I/O bus 151 to which external I/O devices are connected. Different versions of I/O adapters 152 can be designed, such as to interface with secondary storage such as disks and tapes, and with different standard I/O buses such as VMEbus and MULTIbus, as well as with custom buses. The I/O processor unit 153 can be any kind of existing standard microprocessor, or can be a custom microprocessor or random logic. I/O programs, including disk control programs, can reside on the MIO 154.

Data transfer modes on the system bus 141 are defined by the CT (i.e. Cycle Type) code via a CT bus. In the preferred embodiment, data cache-MMU 130 to Main Memory 140 (i.e. Mp) data transfers can be either in a quadword mode (i.e. one address followed by four consecutive data words) or a singleword mode.

On I/O read/write operations, initiated by an I/O processor, IOP 150, the block mode can be declared in addition to the single and quadmodes described above. The block mode allows a 16-word consecutive data transfer to increase data transfer rate on the system bus 141. This is usually utilized only to 'write-thru' pages on I/O read. On I/O write, this can be declared to either 'write-thru' or 'copy-back' pages. When the IOP 150 initiates the data transfer from main memory 140 to the IOP 150, a cache may have to respond to the IOP's request, instead of the main memory 140 responding on a copy-back scheme, because it may not be the main memory 140 but the data cache 130 which has the most recently modified data. A special control signal is coupled to the caches 120, 130, and to main memory 140 (i.e. CBSY/ and RDY/ signals).

For a read-modify-write operation, the single-read operation is followed by a singleword write operation within one bus request cycle.

The main memory 140 can be comprised of multiple boards of memory connected to an intra-memory bus. The intramemory bus is separated into a main memory address bus and a main memory data bus. All the data transfer modes as described above are supported.

Boot ROM is located in a special address space and can be connected directly to the system bus 141.

Referring again to FIG. 1, the processor 110 is also shown coupled to an interrupt controller 170 via interrupt vector and control lines 111. The interrupt controller 170 as shown is coupled to the main memory 140 via the interrupt lines 145, to the IOP 150, via the interrupt lines 155, and to the Array Processor 188 via interrupt lines 165. The interrupt controller 170 signals interrupts to the processor 110 via interrupt lines 111.

An interrupt controller 170 is coupled to respond to interrupt requests issued by bus master devices.

The CPU has a separate independent interrupt bus 111 which controls maskable interrupts and couples to the interrupt controller 170. Each level interrupt can be masked by the corresponding bit of an ISW (i.e. Interrupt Status Word) in the CPU. All the levels are vectored interrupts and have common request and acknowledge/enable lines.

The bus interrupt controller 170 enables several high level interrupt sources to interrupt the CPU 110. In one embodiment, the interrupt controller 170 is of the parallel, fixed priority type. Its protocol is similar to that of the system bus 141, and multiplex's the group and level over the same lines.

The interrupt controller 170 is coupled to each potential interrupting devices by the following signals:

IREQX/: InterruptREQuest from device x

This signal is issued to the interrupt controller 170 by the interrupting device as a request for service.

IENX/: InterruptENable to device x

This is issued by the interrupt controller 170 to the interrupting device to indicate that it has been granted interrupt service.

IBUS<4:0>: InterruptBUS

These five lines carry the interrupts group and level to the interrupt controller 170. This is a three state bus.

IREJ/: InterruptREJect

This signal indicates to the interrupting device that the CPU 110 has refused to accept the interrupt in this group. This is connected to all interrupt devices.

The interrupt controller 170 is coupled to the CPU, or CPU'S, 110 by the signal lines 111 as follows:

IR/: CPU Interrupt Request

IR/ indicates the existence of a pending vectored interrupt, the level of which is available on the VCT<2:0> lines.

IAK/: CPU Interrupt AcKnowledge

The CPU 110 sends out IAK/ to indicate that the interrupt is accepted, and at the same time reads the vector number through the VCT<4:0> lines. IAK/ and IR/ configure a handshake scheme.

MK: MasKed response

Each CPU which is masking out the current interrupt returns an MK signal instead of an IAK/ signal. The interrupt is not latched in the CPU in this case. MK can be used by the interrupt controller to release the masked interrupt and give way to a newly arrived higher level interrupt.

VCT<5:0>: level and vector code

VCT lines are multiplexed, and provide a level number and a vector number. A level number 0–7 is put on the VCT<2:0> lines when IR/ is active. When IAK/ is activated by the CPU, the VCT<4:0> lines have a vector number which identifies one of 32 interrupts of that level. The VCT lines couple outputs from the interrupt controller 170 to the CPU, or CPU'S, 110.

The CPU 110 activates IAK/, and inputs the vector number, through IBUS<4:0> lines, that identifies one of 32 interrupts in each level. In a multi-processor environment, these levels can be used to let the system have a flexible interrupt scheme. As an example of the interrupt scheme in a multi-processor system, when all the IREQX/ lines are activated, the CPU's enable bits in the ISW distinguish whether or not the CPU should accept the interrupt. Each level of interrupt thus has 32 interrupts and the level can be dynamically allocatable to any one of the CPUs by controlling the enable bits in SSW (i.e. system status word).

MK (masked) signals are activated, instead of IAK/, by the CPUs which are masking out the current interrupt. The interrupt is ignored (i.e. not latched) by those CPUS. These signals allow the interrupt controller 170 to reserve the masked interrupt and let a higher interrupt be processed if it occurs.

Beyond the elements as described above for FIG. 1, additional systems elements can be added to the architecture,, and coupled via the system bus 141 into the system.

A bus arbiter 180 is coupled to the system bus 141 and to system elements coupled to the system bus 141, such as to the instruction cache-MMU 120 and data cache-MMU 130, for selectively resolving channel access conflicts between the multiple potential "master" elements coupled to the system bus 141. This maintains the integrity of communications on the system bus 141 and avoids collisions of data transfers thereupon. The bus arbiter 180 has bus request and bus grant inputs and outputs, respectively, coupled to each of the instruction cache-MMU 120, data cache-MMU 130, and to IOP 150. For example, if the instruction cache-MMU 120 requests a transfer of instruction data from the main memory 140 at the same time as the IOP 150 requests transfer of data to or from the IOP 150 relative to the main memory 140, the bus arbiter 180 is responsible for resolving the conflict so that the two events would happen in sequence, rather than allowing a conflict and collision to occur as a result of the simultaneous attempts.

The bus arbitration between bus masters is done by the bus arbiter 180. Each bus master activates its Bus Request BR line when it intends to Access the system bus 141. The bus arbiter 180 returns a Bus Granted (BG) signal to the new master,, which has always the highest priority at that time.

The bus master, having active BR and BG signals, is able to maintain the right of the bus by keeping its BR signal active until the data transfer is complete. Other masters will keep their BR signals active until its respective BG signal is activated in turn.

The system bus 141 is a shared resource. Only one unit can have the use of the bus at any one time. There are a number of potential "bus master" units coupled to the system bus 141, each of which could attempt to access the system bus 141 independently. The bus arbiter 180 is a necessary element to be coupled to the system bus 141, controlling bus access.

There are, in general, two arbitration priority techniques: a fixed priority, and rotating or scheduled, priority. There are also two kinds of signal handling schemes: a serial (i.e. daisy-chained) and a parallel. The serial scheme when configured as a fixed priority system requires less circuitry than a parallel scheme, but is relatively slow in throughput speed. The combination of a serial scheme and a rotating priority can be provided by a high performance bus arbiter 180. The parallel scheme can be realized with either a fixed or a rotating priority, and is faster in speed than a serial or mixed scheme, but requires much more circuitry. The bus arbiter 180 of the present invention can utilize any of these schemes.

In an alternative embodiment, a rotating priority scheme can give every bus master an equal chance to use the system bus. However, where IOPs or one particular CPU should have higher priority, a fixed priority is usually preferable and simpler.

The bus arbiter 180 can also provide the function of checking for any long bus occupancy by any of the units on the system bus 141. This can be done by measuring the active time of a bus grant signal, BG. If the BG signal is too long in duration, a bus error signal, BERR, can be generated to the bus master currently occupying the system bus 141. BERR is also generated when Parity ERRor/ occurs.

As further illustrated in FIG. 1 an array processor 188 can be coupled to the system bus 141. Complex computational problems compatible with the array processor's capabilities can be downloaded to provide for parallel processing of the downloaded data, with the resultant answers being passed back via the system bus 141 (e.g. back to main memory 140 or to the data cache-MMU 130 and therefrom to the CPU for action thereupon).

As discussed above, the I/O Processing Unit (IOP) 150 couples to the system bus 141 and has means for coupling to an I/O bus 151. The IOP 150 can provide for direct transfer of data to and from the main memory 140 and from and to the secondary storage device coupled to the IOP 150. The IOP 150 can also be coupled as a "bus master" to the bus arbiter 180.

The IOP 150 can alternatively or additionally provide for protocol conversion. In this embodiment, the protocol IOP 150 is coupled to the system bus 141, and is also coupled to an external I/O bus 151. Preferably, the IOP 150 is also coupled to the bus arbiter 180. The protocol conversion IOP 150 manages the interface access and protocol conversion of digital information between any of the system elements coupled to the system bus 141 and provides for transfer of the digital information via the external communications I/O bus 151 to the external system. Thus, for example, the system bus 141 architecture and transfer protocol can be made to interface with non-compatible system and bus structures and protocols, such as interfacing to a Multibus system.

FIGS. 7A-C illustrate the virtual memory, real memory, and virtual address concepts, respectively. Referring to FIG. 7A, the virtual memory as seen by the CPU 110 is illustrated. The virtual memory is illustrated as comprising a $2^{32}$ word 32-bit memory array, binary addressable from 0 to FFFF FFFF (hexadecimal). This virtual memory can be visualized as comprising 1,024 ($2^{10}$) segments, each segment having 1,024 (i.e. $2^{10}$) pages, each page having 4,096 (i.e. $2^{12}$) bytes. Thus, the CPU can address a 4 gigabyte virtual memory space. This virtual memory address space is independent of the actual real memory space available. Up to 4 gigabytes of real memory (i.e., main memory) can be addressed with the 32-bit real address of the present embodiment.

As illustrated in FIG. 7B, real memory space is represented by a real address, RA, from 0 to FFFF FFFF (hexadecimal). The memory management unit of the present invention provides very high speed virtual to real memory space address translation as needed. The memory management unit provides a mapping for correlating the cache memory's contents and certain prestored information from virtual to real memory space addresses.

Referring to FIG. 7C, the 32-bit virtual address, VA, is comprised of a 10-bit segment address, bits 31 to 22 (i.e. VA<31:22>), a 10-bit page address, bits 21 to 12 (i.e. VA<21:12>), and a 12-bit displacement address, bits 11 to 0 (i.e. VA<11:0>). In a preferred embodiment, the memory management unit provides set associative mapping, such that the displacement address bits 0 to 11 of the virtual address correspond to bits 0 to 11 of the real address.

Referring to FIG. 8, a block diagram of the cache memory management unit is illustrated. In a preferred embodiment, a single cache memory management unit architecture can be utilized for either instruction or data cache purposes, selected by bonding at the time of manufacture, or strapping at the time of system configuration. The cache-memory management unit has a CPU interface coupling to the processor cache bus 121 or 131, and a system bus interface coupling to the system bus 141. The CPU interface is comprised of an address input register 210, a cache output register 230, and a cache input register 240. The system bus interface is comprised of a system bus input register 260 and a system bus output register 250. The address input register 210 couples the virtual address via bus 211 to a cache memory system .220, a translation look-aside buffer (i.e. TLB) 270, and a direct address translation logic (i.e. DAT) unit 280. The data output from the cache memory system 220 is coupled via bus 231 to the cache output register 230. The cache memory system receives real address inputs from the TLB 270 and additionally receives a real address input via bus 261 from the system input register 260. Data input to the cache memory system 220 is via the cache data bus (i.e. DT) 241, which couples to each of the cache input register 240, the system bus input register 260, the system bus output register 250, cache output register 230, TLB 270, and DAT 280, for providing real address and data pass-through capabilities. The TLB 270 and DAT 280 are bidirectionally coupled to the DT bus 241 for coupling of address translation data from the page table in real memory via the DT bus 241 between the TLB 270 and the DAT 280. The system bus interface can communicate with TLB 270 as well as with the cache memory system 220 via the DT bus 241.

Referring to FIG. 9, a detailed block diagram of the cache-MMU is shown, illustrating the data flow operations internal cache-MMU.

The virtual address is taken from the fast cache bus, 121 or 131 , via the address input register 210. This address is then split into three parts. The high order bits (<31:12>) are sent to the TLB 350 and DAT 280. Bits <10:4> are sent to the cache memory 320 buffer selection logic to select a line therein. Bits <3:2> are sent to the multiplexer 341 which selects one of the four output words of the quadword, or line, registers 333 and 335. Bits <0:1> are used only on store byte/store halfword operations, as described below.

The TLB 350 uses the low order 6 bits <17:12> of the virtual page address to access a two way set associative array 352 and 354 which has as its output the real address of the page corresponding to the virtual address presented. Bit <11> is passed through without translation. Since the page size is 4 K, bit <11> is the MSB (Most Significant Bit) of the displacement of real address within the page. Therefore, if a match is found, the real address is gated out and into the comparators 332 and 334 for comparison to the cache real address tag outputs 322 and 326.

If no match is found in the TLB 350, then the DAT (dynamic address translator) 280 is invoked. The DAT, by use of the segment and page tables for the active process, translates the virtual address presented to a real address. The real address (e.g. See FIG. 19) is loaded into the TLB 350, replacing an earlier entry. The TLB 350 then sends the real address to the cache 320.

The cache data buffer 321 and 322 is a set associative memory, organized as 128 sets of two lines of 16 bytes each. A set is comprised of a real address tag and 16 contiguous Bytes. Bits <10:4> of the virtual address select a set in the cache data buffer. The 16 bytes of data for each of the two lines in the set are gated out into the two quadword registers in the cache logic.

The comparators 332 and 334 compare the real address (from the TLB) with both of the real address tags, 322 and 326, from the cache data buffer. If there is a match, then the appropriate word from the line matched is gated out to the COR 230. Bits <3:2> are used to select the appropriate word via multiplexer 341. If the valid bit for a line is off, there is no match.

For byte or halfword loads, the cache-MMU provides the entire word, and the CPU 110 selects the byte or halfword. For byte or halfword stores, there is a more complex sequence of operations. The byte or half word from the CPU 110 is placed in the CIR 240. The cache reads out the word into which the byte(s) is being stored into the COR 230. The contents of the CIR 240 and COR 230 are then merged and are stored in COR 230.

If there is a miss (i.e. no match), then the real address is sent over the system bus 141 to main memory 140 and a 16 byte line is received in return. That 16 byte line and its associated tags replace a line in the cache data buffer 321 and 323. The specific word requested is then read from the cache-MMU.

The address register 210 functions as the address register in the data cache-MMU and as the program counter in the instruction cache-MMU. The function as either an instruction cache-MMU or a data cache-MMU can be determined by hardwired strapping. For a monolithic integrated circuit cache-MMU embodiment, this decision can be made at time of final packaging (e.g. such as by strapping or bonding a particular pin to a voltage or to ground). The address register 210 stores the address output from the CPU 110. As described before, this address is 32 bits in length, bits 0 to 31.

The cache memory subsystem 320 is divided into two equal halves labelled "W", 321, and "X", 323. Each half is identical and stores multiple words of data, the real address for that data, and certain control information in flag bits. The internal structure of the cache is described in greater detail with reference to FIG. 10. Each half of the cache, W and X, provide address outputs and multiple words of data output therefrom, via lines 322 and 324 for address and data output from the W cache half, and address and data outputs 326 and 328 from the X cache half 323.

In the preferred embodiment, the data output is in the form of quadwords output simultaneously in parallel. This is complimentary to the storage structure of four words in each half, W and X, of the cache for each line in the cache half, as illustrated in FIG. 10. The quadword outputs from the two halves, W and X, of the cache, respectively, are coupled to quadword line registers 333 and 335, respectively. The number of words in the line registers corresponds to the number of words stored per line in each half of the cache. The address outputs from each half of the cache, W and X, 321 and 323, respectively, are coupled to one input each of comparators 332 and 334, respectively. The other input of each comparator 332 and 334 is coupled to the output of a multiplexer 347 of the TLB unit which provides a real address, bits 31 to 12, output. Bit 11 comes directly from the address register 210. The real address, bits 31 to 11, are compared via the comparators 332 and 334, respectively, to the outputs of the address interface from each of the cache halves W, 321, and X, 323, respectively, to determine whether or not the requested address corresponds to the addresses present in the cache 320. The address register 210 provides an output of bits 10 to 4 to the cache memory subsystem, so as to select one line therein. The real address stored in that line for each half, W and X, of the cache memory 320 is output from the respective half via its respective address output line, 322 and 326, to its respective comparator, 332 and 335. The outputs from each of the line registers 333 and 335 are coupled to the multiplexer 341. The address register 210 provides output of bits 3 and 2 to select one of four consecutive words from the quadword storage line registers 333 and 335.

The selected word from each of the line registers are outputs from multiplexer 341 to multiplexer 343. The selection of which line register, i.e. 333 or 335, output is to be output from multiplexer 343 is determined responsive to the match/no-match outputs of comparators 332 and 334. The multiplexer 343 couples the data out bits 31 to 0 to the processor cache bus, via the cache output register 230 of FIG. 4. The match/no-match signals output from comparators 332 and 334 indicate a cache hit (i.e. that is that the requested real address was present in the cache and that the data was valid) or a cache miss (i.e. requested data not present in the cache) for the respective corresponding half of the cache, W (321) or X (323). The real address bits 31 to 11, which are coupled to the comparators 332 and 334 from the multiplexer 345. The address register 210 output bit 11, corresponding in the set associative mapping to the real address bit 11, is concatinated, with the real address output bits 31 to 12 from the multiplexer 345 of the TLB 270.

Figure 8A:
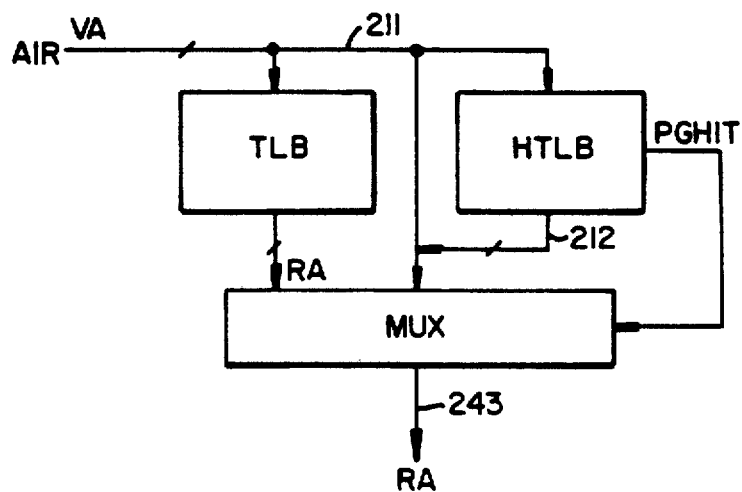
FIG. 8A shows the translation lookaside buffer subsystem (TLB) in more detail.

FIG. 8A illustrates a more detailed embodiment of the translation lookaside buffer, 270 of FIG. 8, comprising hardwired and read-write memory based translation subsystems.

Figure 8B:
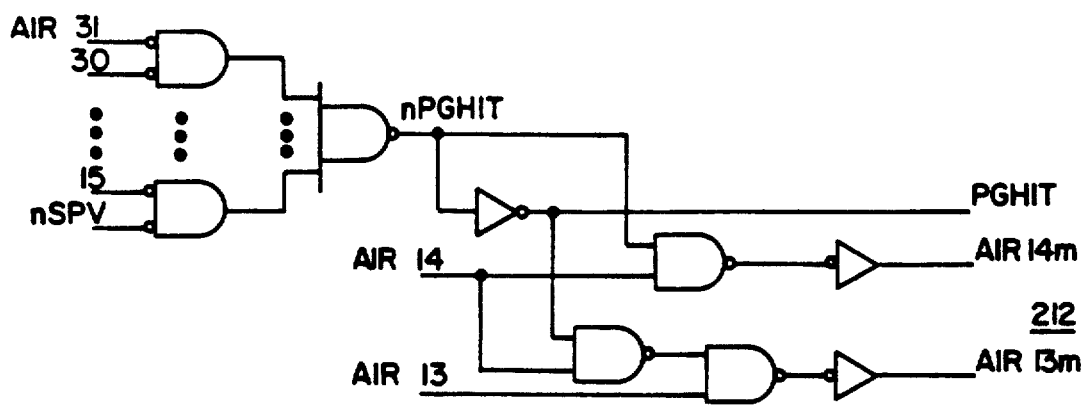
FIG. 8B shows the hardwired translation lookaside buffer (HTLB) in more detail.

FIG. 8B illustrates an embodiment of the hardwired translation lookaside buffer (HTLB) in greater detail. Hardwired combinational logic is selectively enabled by signal nsPV so as to provide active and valid address translation for Supervisor Mode pages 0 to 7. The Virtual address stored in the Address Input Register (AIR) is selectively decoded for a page hit (PGHIT signal responsive to AIR $<31:15>$) and a translated address (AIRM $<14, 13>$ signal output responsive to AIR $<14, 13>$).

The TLB 270 of FIG. 8 is shown in greater detail in FIG. 9, as comprising a storage memory 350 comprising a W half 352 and an identical X half 354, each having multiple lines of storage, each line comprising a virtual address, flag status bits, a real address. Each half provides a virtual address output and a real address output. The virtual address output from the W half of the TLB 352 is coupled to comparator 362. The virtual address output of the X half 354 is coupled to comparator 364. The other input to the comparators 362 and 364 is coupled in common to the address register 210 output bits 31 to 18. A line is selected in the TLB responsive to the address register 210's output bits 17 to 12, which select one of the lines in the TLB as the active selected line. The virtual address output from the TLB W and X halves, 352 and 354 respectively, corresponds to selected line. The "match" output lines from comparators 362 and 364 are each coupled to select inputs of a multiplexer 345 which provides a real address output of bits 31 to 12. The real address outputs for the selected line (i.e. for both halves) of the TLB 350 are coupled to the multiplexer 345. On a TLB hit, where there is a match on one of the halves, W or X, of the TLB, the corresponding comparator provides a match signal to the multiplexer 345 to select the real address for the half of the TLB having the match of the virtual addresses, to provide its real address output. In the event of a TLB miss, a TLB miss signal 372 is coupled to the direct address translation unit 280. The DAT 280 provides page table access as illustrated at 374, and provides replacement of TLB lines as illustrated at 375. The operation of the DAT will be described in greater detail later herein. On a cache miss, the requested addressed data is replaced within the cache as indicated via line 325.

Referring to FIG. 10A, the organization of the cache memory system is illustrated. The cache memory system 320 is comprised of three fields, a Used bit field, and two identical read-write memory fields, W and X. The first field 329 is comprised of a Used "U" bit memory, indicating whether the W or X half was the most recently used half for the addressed line of cache memory 320. The W and X memories each contain multiple lines (e.g. 128 lines). The U-memory field 329 has the same number of lines (e.g. 128 lines). The storage arrays W and X of cache memory subsystem 320 can be expanded to multiple planes (i.e. more than two equal blocks), with the size of the U-memory word correspondingly changed.

Each line in each cache memory subsystem half, W and X respectively, contains multiple fields, as shown in FIG. 10B. Each line in the W or X subsystem memory contains an enable bit "E", a line valid bit "LV", a line dirty bit "LD", a real address field "RA", and multiple data words "DT". The enable bit set indicates that the respective associated line is functional. The enable bit can be laser reset after final test as part of the manufacturing process. The line valid bit LV indicates whether or not the entire line is valid. It is invalidated on a cold start or under processor command. The line dirty bit LD indicates whether the respective associated current line of the cache memory subsystem has been altered by the processor (i.e. main memory is not current). The real address field, illustrated as 21 bits, comprises the most significant 21 bits for the real address in main memory of the first stored data word which follows. The multiple data words, illustrated as four words DTO to DT4, are accessed by the processor instead of main memory. Each data word contains multiple bits, e.g. 32 bits.

As illustrated in FIG. 11A, the TLB subsystem 350 is comprised of three fields, a Used "U" field 359, and dual high speed read-write memory fields, W and X memory subsystem. T- W and X memory subsystems are equivalents forming two halves of the cache memory storage. As illustrated, each half contains 64 lines of addressable storage having 47-bit wide words, and supports the virtual to real address translation. The Used field of each line performs in a manner similar to that which is described with reference to FIG. 10A.

As illustrated in FIG. 11B, each storage line in W and X is comprised of a 14 bit virtual address "VA" field, a 20 bit real address "RA" field, a supervisor valid bit field, a user valid bit UV field, a dirty bit "D" field, a referenced bit "R", a protection level word "PL" field, illustrated as four bits, and a system tag "ST" field, illustrated as five bits.

The TLB is a type of content addressable memory. It is organized as a set associative buffer and consists of 64 sets of two elements each. The low order 6 bits of the virtual page address, VA <17:12>, are used to select a set, i.e. a line of storage. Then, the upper 14 bits of the virtual address, VA <31:18>, are compared (i.e. 362 and 364) to the key field VA output of both elements 352 and 354 of the set. On a TLB hit, the real address field (20 bits) RA of the TLB line entry which matches is output via multiplexer 345, along with the associated system tags and access protection bits. A TLB translation search is provided responsive to 14 bits of virtual address, supervisor valid and user valid.

As illustrated in FIG. 12, the cache memory is organized on a quadword boundary. Four addressable words of real address memory are stored in each line for each half (i.e. W and X) of the cache memory system 320. The cache memory subsystem provides quadword output within the quadword boundaries to further accelerate cache access time. For example, on a load operation, when the current address is within the quad boundary of the previous address, then the cache access time is minimal (e.g. two clock cycles). When the current address is beyond the quad boundary of the previous address, the cache access time is longer (e.g. four clock cycles).

As discussed elsewhere herein in greater detail, part of the TLB provides hardwired translation logic for critical functions. This provides a very high speed guaranteed virtual to real mapping and translation capability. The hardwired translation logic block functions are illustrated in FIG. 13. The translation and system information is provided for critical functions such as boot memory, memory management, I/0, vectors, operating system and reserved locations, applications reserved locations as discussed above in greater detail with reference to FIGS. 11A-B.

In addition to the read-write TLB, there are eight hardwired virtual to real translations, as discussed with reference to FIG. 13. Some of these translations are mapped to real pages 0-3. Page 0 in virtual space, the first page in the low end of real memory, is used for trap and interrupt vectors. Pages 1-3 are used as non-cacheable page tables for initialization of the system. Pages 6 and 7 are used for bootstrap system memory and pages 4 and 5 are used for memory-mapped I/O. These eight page translations will only be used when in supervisor mode. As a result of these being hardwired in the TLB, a miss or page fault will never occur to the first eight virtual pages of system space.

The PL bits indicate the protection level of the page. The function code and system status word which accompanies the VA (virtual address) from the CPU contains the mode of memory reference. These modes are compared with the PL bits and if a violation is detected, a CPU Trap is generated.

The cache-MMU provides memory access protection by examining the four protection bits (PL) in the TLB entry or page table entry. This is accomplished by comparing the supervisor/user bit and K bit in the system status word (SSW) with the access code, and, if there is a violation access is denied and a trap is generated to the CPU.

The virtual address which caused the trap is saved in a register and can be read with an I/O command.

There are three unique traps generated:
1. Instruction Fetch Access Violation—Instruction cache only.
2. Read Access Violation—Data cache only.
3. Write Access Violation—Data cache only.

| Access Code | SSW S,K Bits | | | |
|---|---|---|---|---|
| | 11 | 10 | 01 | 00 |
| 0000 | RW | — | — | — |
| 0001 | RW | RW | — | — |
| 0010 | RW | RW | RW | — |
| 0011 | RW | RW | RW | RW |
| 0100 | RW | RW | RW | R |
| 0101 | RW | RW | R | R |
| 0110 | RW | R | R | R |
| 0111 | RWE | RWE | RWE | RWE |
| 1000 | RE | — | — | — |
| 1001 | R | RE | — | — |
| 1010 | R | R | RE | — |
| 1011 | R | R | RE | RE |
| 1100 | — | RE | — | RE |
| 1101 | — | — | RE | — |
| 1110 | — | — | — | RE |
| 1111 | — | — | — | — | where:
RW = read/write,
E = instruction execution,
— = no access,
S = supervisor/user, and
K = protect.

The (D) dirty bit in the data cache line indicates that the line has been modified since reading it from main memory.

The dirty bit in the TLB indicates that one or more words in that page have been modified.

When a word is to be written in the cache, the dirty bit in the line is set. If the dirty bit in the TLB is not set, it is then set and the line in the TLB is written back in the page table. If the dirty bit in the TLB is already set, then the page table is not updated. This mechanism will automatically update the page table dirty bit the first time the page is modified.

The referenced bit (R) in the TLB is used to indicate that the page has been referenced by a read or write at least once. The same approach that issued for the D bit will be used for updating the R bit in the page table entry.

The valid bits (SV, Uv) are used to invalidate the line. On a cold start, both SV and UV are set to zero. On a context switch from one user to another, UV is set to zero. UV is not reset when going from User to Supervisor or back to the same user. On DAT logic, when new translation information is loaded into the TLB, either SV or UV is set to one depending upon the mode at that time.

A 20 Bit Real Address (RA) is also stored at each line location. When the virtual address has a match, the real address is sent to the cache for comparison or to the SOR.

When the system is running in the non-mapped mode (i.e. no virtual addressing), the TLB is not active and the protection circuits are disabled.

The TLB responds to the following Memory Mapped I/O commands:

Reset TLB Supervisor Valid Bits—All SV bits in the TLB are reset.

Reset TLB User Valid Bits—All UV bits in the TLB are reset.

Reset D Bit—Set all dirty (D) bits to zero in the TLB.

Reset R Bit—Set all referenced (R) bits to zero in the TLB.

Read TLB Upper—Most significant part of addressed TLB location is read to CPU.

Read TLB Lower—Least significant part of addressed TLB location is read to CPU.

Write TLB Upper—Most significant part of addressed TLB location is written from CPU.

Write TLB Lower—Least significant part of addressed TLB location is written from CPU.

Memory mapped I/O to the cache-MMU goes through virtual pages 4 and 5.

The system tags are used by the system to change the cache-MMU strategy for writing (i.e. copy back or write through), enabling the cache-MMU and handling I/O. The system tags are located in the page tables and the TLB.

| System Tags | | | | | |
|---|---|---|---|---|---|
| T4 | T3 | T2 | T1 | T0 | |
| 0 | 0 | 0 | T1 | T0 | Private, write-through |
| 0 | 1 | 0 | T1 | T0 | Private, copy-back |
| 0 | 1 | 1 | T1 | T0 | Non-cacheable |
| 0 | 0 | 1 | T1 | T0 | Common, write-through |
| 1 | X | 0 | T1 | T0 | Non-cacheable, memory-mapped I/O |
| 1 | X | 1 | T1 | T0 | Non-cacheable, bootstrap area |

R = referenced bit.
D = dirty bit

T4 to T2 of the system tags are brought outside the cache-MMU for decoding by the system. Tag T2 is used to differentiate between bootstrap and I/O space when Tag T4 is 1. Tag T4 is used to differentiate between memory space, and boot or I/O space. These tags are only valid when the cache-MMU has acquired the system bus. These signals are bussed together with tags from other cache-MMU'S.

ST(0 0 1 x x): Common, Write-through

When virtual page 0 is detected in the TLB in supervisor mode, page 0 of real memory is assigned. This first page of real memory can be RAM or ROM and contains Vectors for traps and interrupts. This hardwired translation only occurs in Supervisor state. The most significant 20 bits of the real address are zero.

ST (1,X,1,X,X)

When pages 6 and 7 in virtual memory are addressed, the system tags are output from the hardwired TLB. This translation occurs only in supervisor state. Pages 6 and 7 of virtual memory map into pages 0 and 1 of boot memory.

The boot memory real space is not in the real memory space.

ST (1,X,0,X,X) Memory-mapped I/O

Pages 4 and 5 in the virtual space, when in supervisor mode, have a hardwired translation in the TLB. The I/O system must decode system tags T2 and T4, which indicate memory mapped I/O.

When this hardwired page is detected in the TLB or page table entry, the read or write command is acted upon as if it were a non-cacheable read or write.

The use and allocation of the I/O space is as follows:

I/O in Supervisor Mode, mapped or unmapped, pages 4 and 5

Pages 4 and 5 of the virtual address space are mapped respectively into pages 0 and 1 of the I/O address space by the hardwired TLB entries. The upper half of page 4 is used for commands to the data and instruction cache-MMU chips.

I/O in Supervisor Mode, mapped, additional pages

I/O space can also be defined in the page table. Any virtual address, except pages 0–7 can be mapped to an I/O page.

I/O Space in the Cache

An I/O address directed to the cache chip should be interpreted as follows:

---

Cache I/O Space

Page 4: cache I/O space
    Addresses 00004000 – 00004BFF – D-cache
    Addresses 00004C00 – 00004FFF – I-cache
Page 5: system I/O space
    Addresses 00005000 – 00005FFF Cache I/O Commands VA<31:12> = 0 0 0 0 4 Hex
VA<11:0> = RA<11:0>
Bit 11 = 0: specifies D-cache I/O space
  Bit 0: 0 = data part; 1 = address part
  Bit 1: 0 = W; 1 – X (compartment)
  Bits 2–3: word position
  Bits 4–10: line number
Bit 11 = 1, Bits 8,9 = 0: specifies TLB
  Bit 10: 0: D-cache; 1: I-cache
  Bit 0: 0 = lower, 1 = upper
  Bit 1: 0 – W; 1 = X
  Bits 2–8: line number
Other:
  Bit 10 = 1; I-cache, Bit 10 = 0: D-cache
    1 x 0 1 ---- 0 0 -- supervisor STO
    1 x 0 1 ---- 0 1 -- user STO
    1 x 0 1 ---- 1 0 -- F Reg. (virtural address of fault)
    1 x 1 1 0 0 0 0 0 1 - - reset cache LV all
    1 x 1 1 0 0 0 0 1 0 - - reset TLB SV all
    1 x 1 1 0 0 0 1 0 0 - - reset TLB UV all
    1 x 1 1 0 0 1 0 0 0 - - reset TLB D all
    1 x 1 1 0 1 0 0 0 0 - - reset TLB R all

---

Store Word

ST(0,1,0,X,X)—Private, Copy-back

A. LV is 1, and HIT: Write word in line and set line and page dirty bit.

B. Miss—Line to be replaced Not Dirty: Read quadword from memory and store in line. Write word in new line and set line and page dirty.

C. Miss—Line to be replaced Dirty: Write dirty line back to memory. Read new quadword into line. Write word in new line and set line and page dirty.

ST(0,0,0,X,X)—Private, Write-through

A. LV is 1, and HIT: Write data word in line and to memory. Set page dirty bit.

B. Miss: Write word in memory and set page dirty bit.

ST(0,0,1,X,X)—Common, Write-through

A. LV is 1 and HIT: Write data word in line and to memory. Set page dirty bit.

B. Miss: Write word in memory and set page dirty bit.

ST(0,1,1,X,X)—Non-cacheable

A. Write word in main memory. If a hit, then purge.

Store Byte/Halfword

ST(0,1,0,X,X)—Private, Copy-back

A. LV is 1, and HIT: Write byte or halfword in line and set line and page dirty bit.

B. Miss—Line to be replaced is Not Dirty: Read quadword from memory and store in line. Write byte or halfword in new line and set line and page dirty.

C. Miss and Line to be replaced is Dirty: Write line back to memory. Read new quadword into line. Write byte or halfword in new line and set line and page dirty.

ST(0,0,X,X)—Private, Write-through

A. HIT: Write byte or halfword in line. Copy modified word from cache line to memory.

B. MISS: Read word. Modify byte or halfword. Write modified word from cache line to memory. (Read-/modify/write cycle.) (No write allocate.)

ST(0,0,1,X,X)—Common, Write-through

A. LV is 1, and HIT: Write byte or halfword in line. Write modified word from cache line to memory.

B. MISS: Read word. Write byte or halfword in line. Write modified word from cache line to memory. (Read/modify/write cycle; no write allocate.)

ST(0,1,1,X,X)—Non-Cacheable

A. Read word into cache chip. Update appropriate byte/halfword and write modified word back to main memory.

Test and Set

ST(0,1,1,X,X)—Non-Cacheable

Read main memory location, test and modify word and store back at same location. Return original word to CPU.

The system bus is dedicated to cache until this operation is complete.

If the following system tag occurs while executing this instruction, an error condition will occur.

| 1 X X X X X X | (m/m I/O space, boot space or private space) |
|---|---|

Read Word/Byte/Halfword

ST(0,1,0,X,X)—Private, Copy-back

A. LV is 1, and HIT: Read word from cache to CPU.

B. Miss—Line to be replaced Not Dirty: Read new quadword from memory into cache. Read word to CPU.

C. Miss—Line to be replaced is Dirty: Write line back to memory. Read new quadword from memory into cache. Read word to CPU.

ST(0,0,X,X) or ST(0,0,1,X,X)—Write-through

A. LV is 1, and HIT: Read word from cache to CPU.

B. Miss: Read new quadword into line. Read word into CPU.

ST(0,1,1,X,X) Non-Cacheable

A. Read word from main memory to CPU.

Common Write From Cache To Memory

ST(0,0,1,X,X)—Common, Write-through

All caches examine the bus and if there is a hit, invalidate the line in cache. If there is not a hit, ignore the bus.

When an I/O system is reading data from the cache or main memory, the real address is examined by the cache and the following action takes place. The TLB is not accessed.

A. LV is 1 and HIT, and LD is 1: Read a word or a line from Cache to I/O.

B. MISS: Read a word, quadword, or 16 words from memory to I/O.

When an I/O is taking place to main memory, the real address is examined by the cache and the following action taken. The TLB is not accessed and therefore the Dirty Bit is not changed in the page table or TLB.

A. LV is 1 and HIT: Write a word, quadword or 16 words from I/O to memory. Invalidate line or lines in cache.

B. MISS: Write a word, quadword, or 16 words from I/O to memory.

Figure 14:
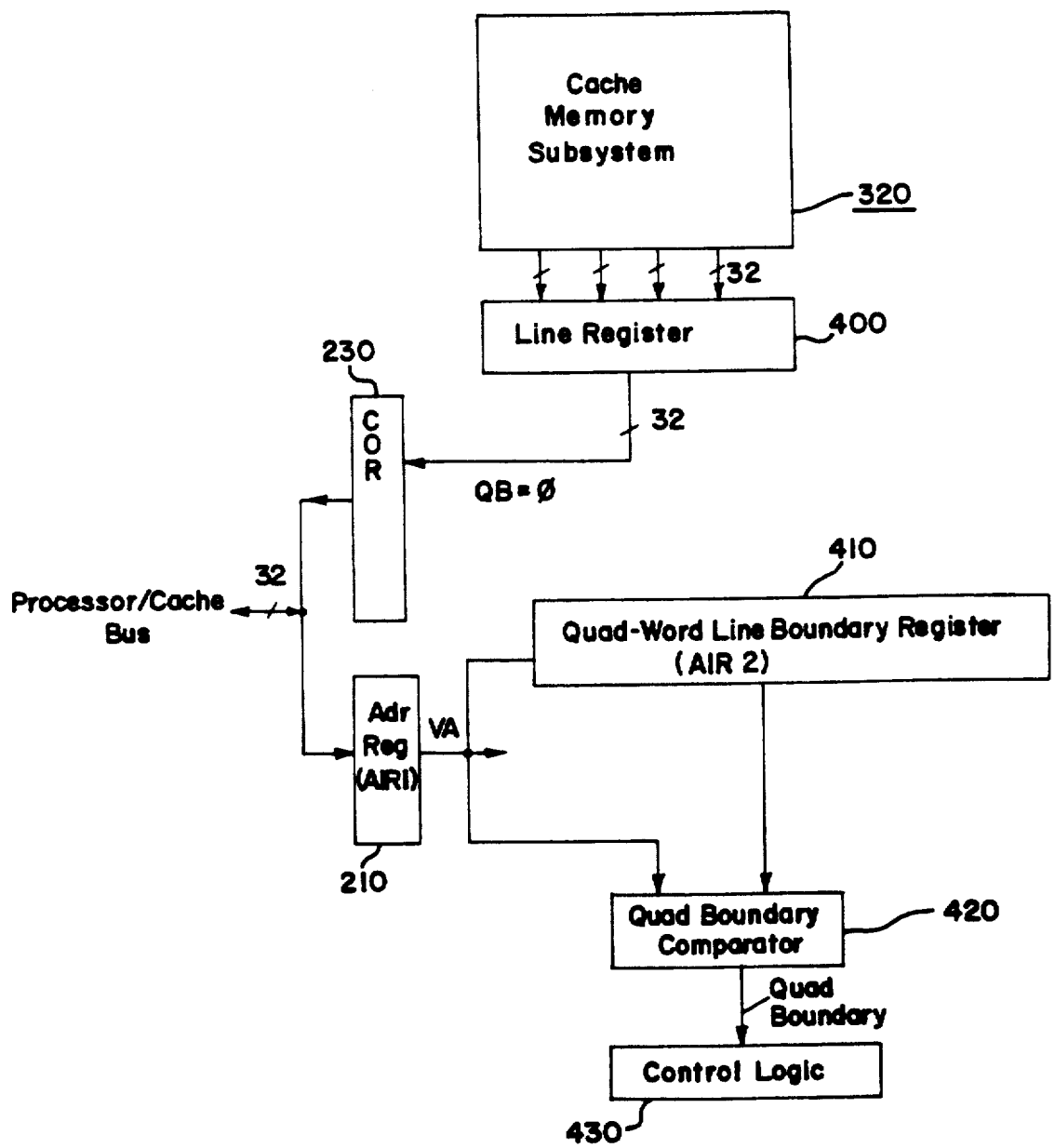
FIG. 14 illustrates the cache memory subsystem and affiliated cache-MMU architecture which support the quadword boundary utilizing line registers and line boundary registers.

As illustrated in FIG. 14, the quadword boundary can be utilized to advantage in a line register architecture. The memory array of the cache memory 320 of FIG. 14 is coupled to a line register 400 which contains four words of word storage within a line boundary. The cache memory system 320 outputs four words at a time per cache hit to the line registers 400 which selectively store and forward the quadword output from the cache memory subsystem 320 to the cache output register, such as COR 230 of FIG. 14. This transfer clears when the quad boundary comparator 420 output quad boundary is one. The output of the cache output register of the system interface of the cache-MMU system is thereafter coupled to the address/data (i.e. ADF) bus of the processor/cache bus (i.e. buses 121 or 131, and bus 115 of FIG. 1).

The address register (i.e. 210 of FIG. 14) is also coupled to the processor/cache interface bus to receive address information therefrom. If the cache and memory management unit is configured as a data cache-MMU, the address register stores the address from the processor/cache bus for use by the cache memory subsystem. If configured as an instruction cache-MMU, the address register 210 is configured as a program counter, to both receive address information from the processor/cache interface bus, and to increment itself until a new authorized address is received from the processor/cache bus.

The output from the address register 210 is coupled to a quad line boundary register 410, quad boundary comparator 420, and indirectly to the state control logic 430. The quadword line boundary register 410 stores the starting address of the quadword line boundary for the words stored in the line register 400.

The output of the quadword line boundary register 410 is coupled to quadword line boundary comparator 420. The comparator 420 compares the register 410 output to the virtual address output of the address register 210 to determine whether the requested word is within the current quadword boundary of the line register 400. The state control logic 430 then determines the selection of either the line register 400 output or the access to the cache memory subsystem 320. The control logic 430 then selectively multiplexes to select the appropriate word from the line registers.

Figures 15, 16:
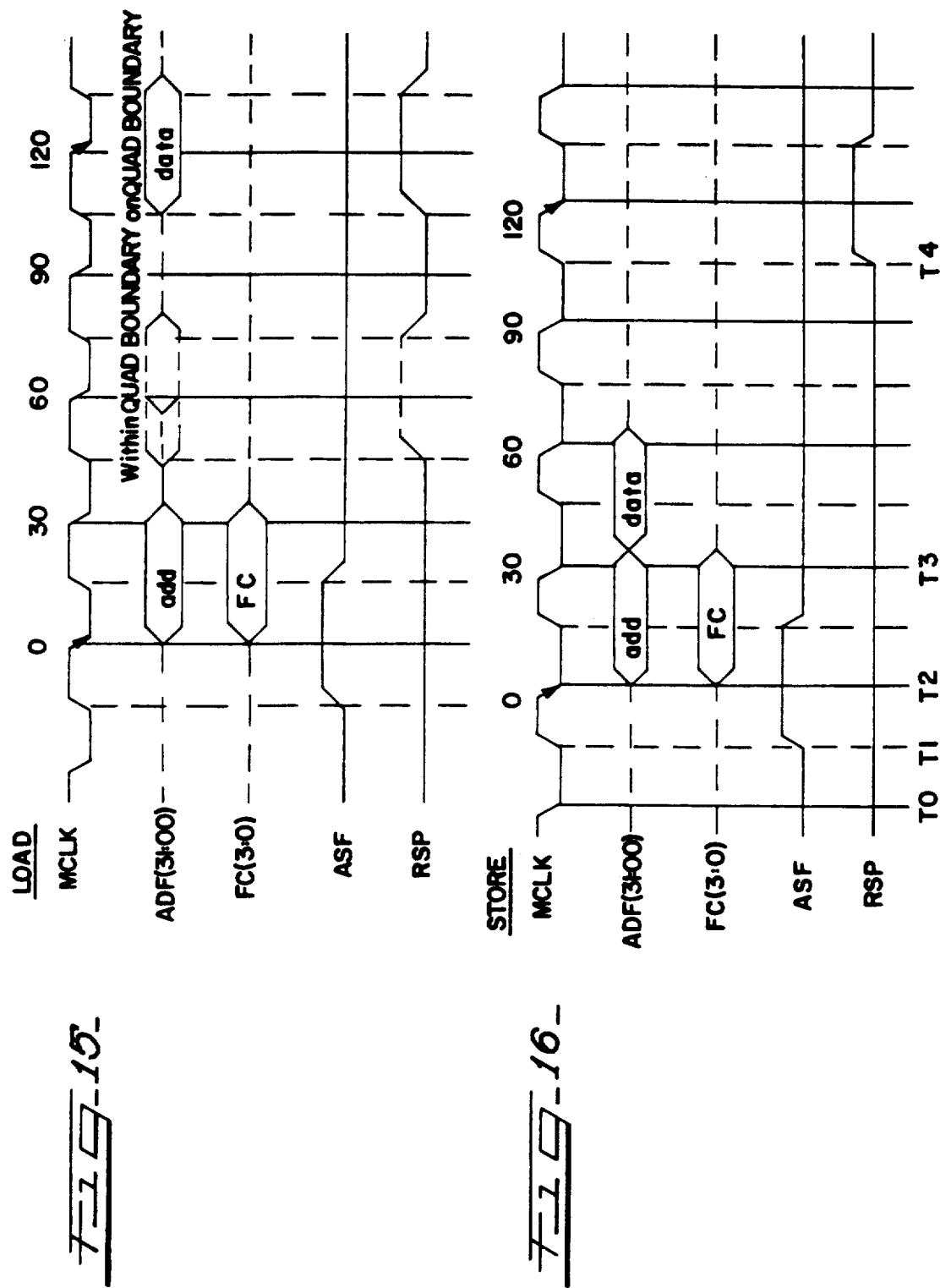
FIG. 15 illustrates the load timing for the cache-MMU systems 120 and 130 of FIG. 1.
FIG. 16 illustrates the store operation for the cache-MMU systems 120 and 130 of FIG. 1, for storage from the CPU to the cache-MMU in copyback mode, and for storage from the CPU to the cache-MMU and the main memory for the write-through mode of operation.

FIG. 15 illustrates the load timing for the cache-MMU systems 120 and 130 of FIG. 1. FIG. 15 illustrates the operation of the data cache 130 loading from the CPU 110, or alternatively of the instruction cache 120 loading on a branch operation. The master clock MCLK signal output of the system clock 160 of FIG. 1 is shown at the top of FIG. 15 with a time chart indicating 0, 30, 60, 90 and 120 nanosecond (i.e. ns) points from the start of the load cycle.

At the beginning of this cycle, a valid address is loaded from the CPU to the address register 210 of the respective cache-MMU system, and a function code is provided to indicate the type of transfer, as discussed in greater detail elsewhere herein. The 0 ns point occurs when the ASF signal is valid indicating an address strobe in process. If the data requested is beyond a quad line boundary for a new access, the data is available at the halfway point between the 90 and 120 nanosecond points of MCLK. However, where the access is for a request within a quadword boundary, the data access timing is much faster (e.g. at the 60 ns point), as shown with the phantom lines on the ADF signal waveform, indicating data transfer within a quad line boundary.

Referring to FIG. 16, the store operation for the cache-MMU systems 120 and 130 of FIG. 1 is illustrated for storage from the CPTJ to the cache in a copy-back mode, and additionally to main memory 140 for the write-through mode. The master clock, MCLK, is output from the system clock 160, as illustrated in FIG. 15 as a reference line. At time T1, the address strobe signal is activated indicating a valid address follows. At time T2, a half MCLK clock cycle later, valid address and function code outputs are generated on the appropriate lines of the processor/cache interface bus, ADF and FC, respectively. At time T3, the address lines are tri-stated (floated) and data is on ADF <31:00> lines. Multiple data words can be transferred. Single, quad or 16-word mode is determined by the function code on the FC lines. At time T4, the RSP signal is output indicating that the transfer is complete, ending the cycle.

Both Copy-back and Write-through main memory 140 update strategies are available in the cache-MMU and can be intermixed on a page basis. The system tag bits located in the page tables are loaded into the TLB to determine which strategy is used.

Copy-back will generally yield higher performance. Data is written back to main memory only when it is removed from the cache-MMU. Those writes can be largely overlapped with fetches of blocks into the cache. Thus, copy-back will, in general, cut bus traffic, and will minimize delays due to queuing on successive writes.

Write-through has two advantages. First, main memory is always up to date, system reliability is improved, since a cache-MMU chip or processor failure will not cause the loss of main memory contents. Second, in a multi-processor system, write through facilitates the maintenance of consistency between main memory shared among the processors.

The operating system can make these tags which determine write-through vs. copy-back available to the users so that they can make the appropriate choice.

Figure 17A:
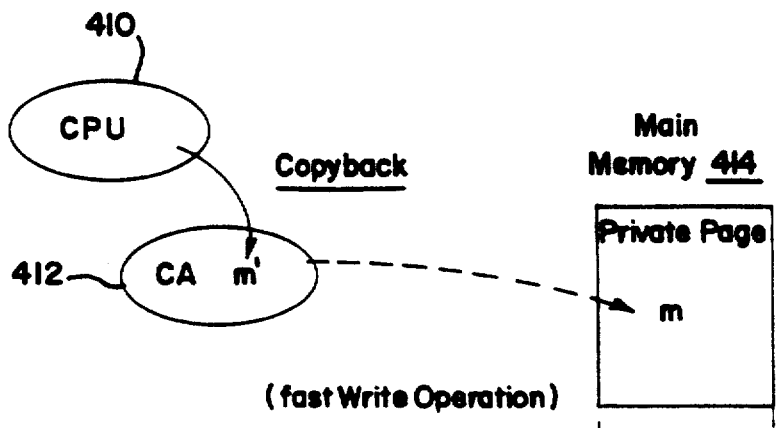
FIG. 17A illustrates the data flow of store operations on Copy-Back mode, and FIG. 17-B illustrates the data flow of operations on Write-Thru Mode.
Figure 17B:
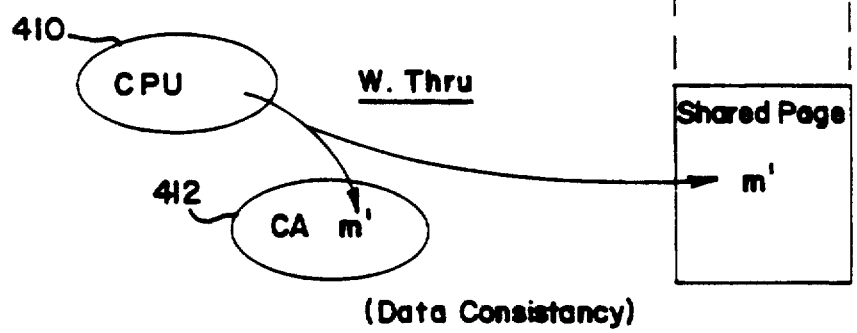

FIGS. 17A-B illustrate the data flow of operations between the CPU 410, the cache-MMU 412, and the main memory 414. Referring to FIG. 17A, the data flow for a copy-back fast write operation is illustrated. The CPU 410 outputs data for storage in the cache-MMU 412. This dirties the contents of the cache memory for that location. When the line in the cache memory which contains dirty data is replaced, the cache memory management unit 412 rewrites the dirty data to the respective private page in main memory 414. This provides the advantage of fast overall operations on write on cache hit.

Referring to FIG. 17B, the write-through mode of operation is illustrated. This mode maintains data consistency, at some sacrifice in overall write speed. The CPU 410 simultaneously initiates write operations to the cache memory of the cache-MMU 412, and to the page in the main memory 414. This insures that the data stored at a particular location in a page is the most current value, as updated by other programs.

Figure 18:
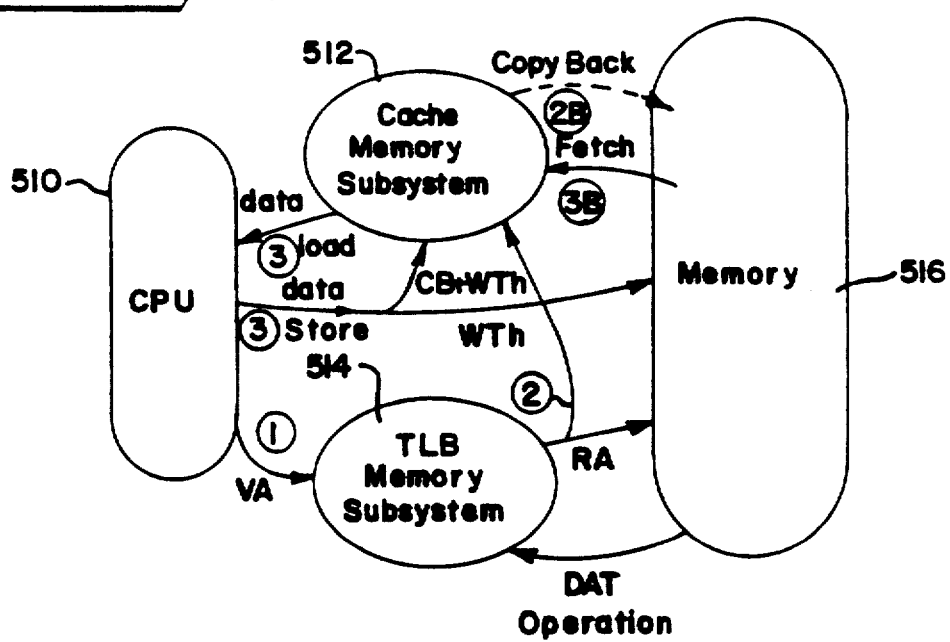
FIG. 18 illustrates the data flow and state flow interaction of the CPU, cache memory subsystem, and TLB memory subsystem.

Referring to FIG. 18, the data flow and state flow interaction of the CPU 510, cache memory subsystem 512, and TLB subsystem 514 are illustrated. Also illustrated is the interaction of the cache-MMU and CPU with the main memory 516, illustrating the DAT operation and the temporal relationship of events.

The CPU 510 outputs a virtual address, at step one, to the TLB subsystem 514 which outputs a real address to the cache memory subsystem 512, at step two. If a write-through operation is occurring or on a cache miss, the real address is also sent to the main memory 516. On a DAT operation, a portion of the virtual address plus the segment Table Origin address are sent to main memory at step two.

At step three, for the store mode, data is written out from the CPU 510 for storage in the cache memory subsystem 512 for both copy-back and write-through modes, and additionally for storage in the main memory 516 for the write-through mode. For the load mode of operation, step three consists of data being loaded from the cache memory subsystem 512 to the CPU 510. On a cache miss, data is loaded from the main memory 516 to the cache memory subsystem 512, illustrated at step 3B, and to the CPU 510 during step three. On a cache miss, when dirty data is present in the cache memory (i.e. the dirty bit is set), the memory subsystem 512 outputs the dirty data back to the main memory 516, illustrated at step 2B.

As illustrated in FIGS. 9-13 and 19, virtual address to real address mapping system information is uniquely stored in each line for each of the W and X halves of the cache memory subsystem. This provides for extremely high-speed translation of virtual to real addresses to accelerate mapping of the virtual to real address space, so as to facilitate necessary in/out swapping procedures with secondary storage systems, such as through the I/O processor 150 of FIG. 1. The system information in each line of storage in the TLB memory subsystem 350 provides all necessary protection and rewrite information. The used bit for each subsystem line provides indication for rewriting into the least recently used half of the memory subsystem. Other replacement strategies could be implemented.

Where a high-speed communications structure is provided, such as in a monolithic integrated cache-MMU, this cache-MMU system architecture enhances very high-speed cache system operation and provides for great applications versatility.

Figure 19:
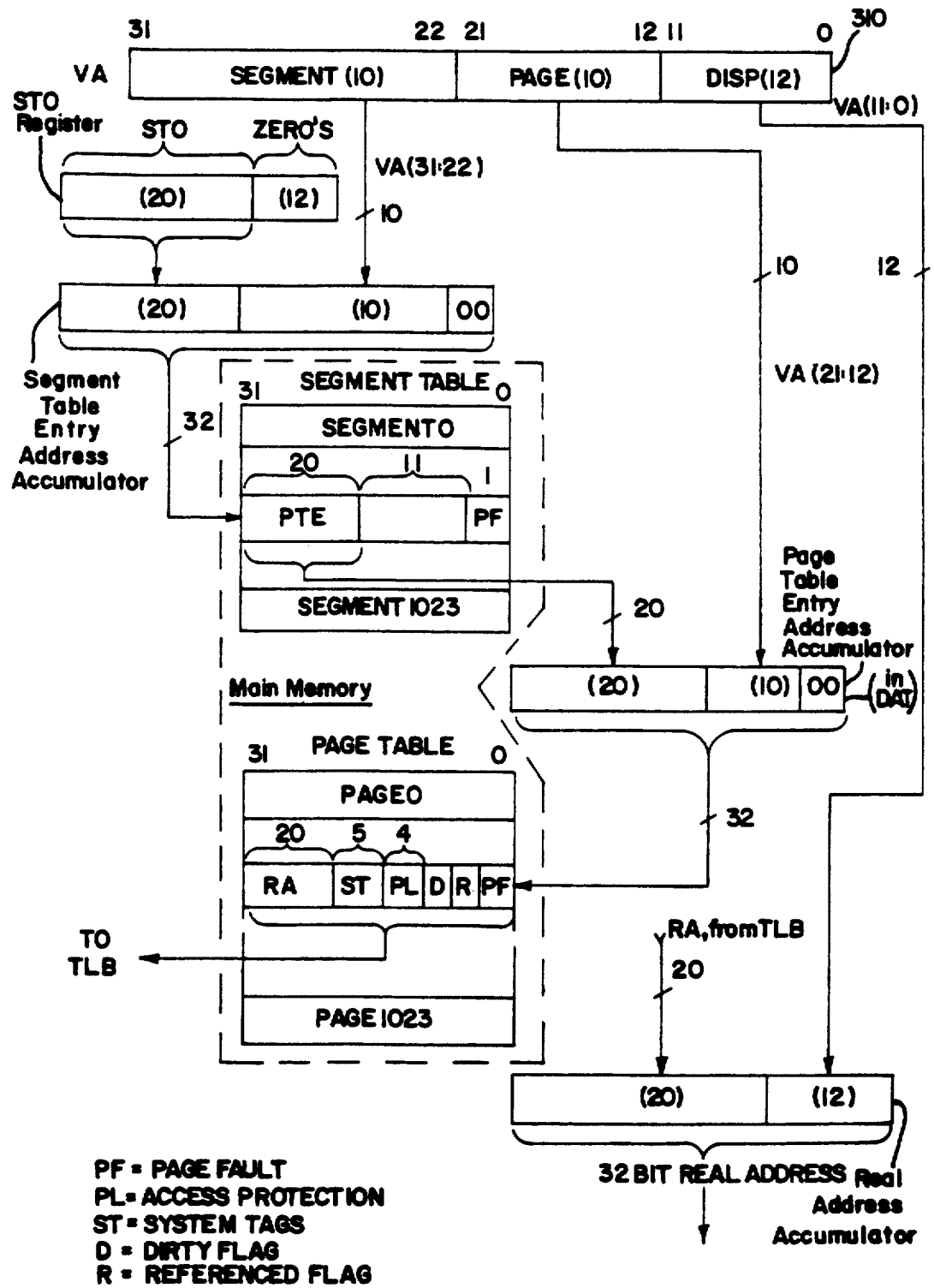
FIG. 19 illustrates the data flow and operation of the DAT and TLB subsystems in performing address translation.

Referring to FIG. 19, the data flow and operation of the DAT and TLB address translation process are illustrated. When a virtual address requires translation to a real address, and there are no translation values, corresponding to the requested translation, stored in the TLB, the operation as illustrated in FIG. 19 occurs. The requested virtual address, as stored in the virtual address register 210, provides a virtual address "VA" (e.g. 32 bits) which requires translation. As discussed with reference to FIG. 7C, the virtual address is comprised of 10 bits of segment data virtual address VA<31:22>, 10 bits of page address, VA<21:12> and 12 bits of displacement address, VA<11:0>.

The DAT logic performs the dynamic address translation when there is a miss in the TLB. The DAT logic performs two read accesses to main memory. The first read adds the segment number to a segment table origin (STO), and obtains the address of the page table. The second read adds the page number to the page table origin, and gets the real address of the page, as well as other useful information such as protection bits, copy back/write through status, dirty bits, etc. For each new user or process a new segment table origin must be used. The STO register in the DAT is loaded under CPU control. There are two STO registers, one for user mode, and the other for supervisor mode. The hardware automatically selects the proper register depending on the mode in the system status word (SSW).

The access protection bits in the page tables are checked by the DAT logic for protect violations. If they occur, a CPU trap is generated. If an uncorrectable error occurs during a DAT operation while reading main memory, such that the data is not corrected and hence suspect, a CPU trap is generated.

A PF bit in the page table or segment table is the page fault indicator. The bit is set or reset by the software.

The system can be in a non-mapped mode, with no virtual addressing. In this mode, the DAT facility is inactive and the protection bits are not used. However, this mode should be used only rarely, due to the vulnerability of the system to bugs and malicious damage.

After the DAT logic has completed a translation, the Virtual Address, Real Address and System Tags are sent to the TLB, where they are stored for future use until replaced.

The DAT will respond to the following Memory Mapped I/O Commands:
  Load Supervisor STO Register (privileged)
  Read Supervisor STO Register
  Load User STO Register (privileged)
  Read User STO Register
  Read Virtual Address that caused page or protection fault.

This is discussed in greater detail with reference to FIG. 22.

As discussed hereinafter with reference to FIG. 21, the cache and memory management unit system includes registers. These registers contain a segment table origin (i.e. STO) register therein for each of the supervisor and user segment table origins for the then current supervisor and user. The segment table origin register contains 20 bits which represent the segment table origin value. As illustrated in FIG. 19, this STO value is concatinated as the most significant portion of a word in an STO Entry Address Accumulator, with the 10-bit segment address from the virtual address register 210 concatinated as the next most significant portion of the word in the STO Entry Address Accumulator. The resultant 30 bit address forms a pointer to a segment table in the main memory.

The Segment Table Entry Address (i.e. STOEA) accumulator, within the cache memory management unit, accumulates and concatinate the address to be output to the main memory so as to address the segment table in main memory. A 32-bit address is constructed by utilizing the segment table origin 20 bits as address bits STOEA<31:12>, utilizing the virtual address segment bits (VA31:22) as the next ten bits, STOEA<11:2>, of the segment table address, and concatinating zeros for bit positions STOEA<1:0> of the segment table address which is output to main memory from the STOEA accumulator. The segment table entry address output from the segment table entry address accumulator of the cache-MMU is output via the system bus to main memory. This provides access to the respective page table entry (i.e PTE) within the segment table in main memory corresponding to the segment table entry address output from the cache MMU system. The most significant 20 data bits, 31:12, of the addressed main memory location are output from the main memory back to the cache-MMU for storage in the Page Table Entry Address (i.e. PTEA) accumulator in the DAT of the cache MMU system. These 20 bits of the page table entry address are concatinated in the P.T.E.A. accumulator as the most significant 20 bits of a 32-bit words. The next most significant 10 bits are concatinated with the output from the virtual address register 310, bits VA<21:12>, representing the page selection bits. The least two significant bits of the page table entry address accumulator output are zeros. The page table entry address accumulator of the cache-MMU outputs a 32-bit address to the main memory via the system bus.

The page table entry address selects the entry point to a line in the page table in main memory. Each line in the page table is comprised of multiple fields, comprising the translated real address, system tags, protection, dirty, referenced, and page fault values for the corresponding virtual address. The selected line from the page table contains, as illustrated, 20 bits of real address "RA", five bits of system tag information ST, four bits of protection level information PL, one bit of dirty information D, one bit of referenced information R, and page fault information PF. These fields are discussed in greater detail with reference to FIGS. 11A-B.

The selected line from the page table is transferred from the main memory back to the TLB in the cache-MMU for storage in the memory array of the TLB. Next, the 20 bits of real address from the TLB, for the just referenced line in the page table, are output and coupled to the most significant 20 bits of the Real Address accumulator in the cache-MMU. These 20 bits are concatinated in the Real Address accumulator as the most significant 20 bits, with the least significant 12 bits of the virtual address register 210, VA<11:0>, providing a 32-bit real address output from the Real Address accumulator. On cache miss, this output from the Real Address accumulator is then output, via the system bus, to main memory to select the desired real address location. Responsive to this Real Address output, a block of words is transferred back to the cache memory subsystem for storage therein. The cache-MMU then transfers the initially requested word or words of information to the CPU. The procedure illustrated in FIG. 19 is only needed when the virtual address contained in the address register 210 does not have corresponding translation values stored in the TLB of the cache-MMU.

Figure 20:
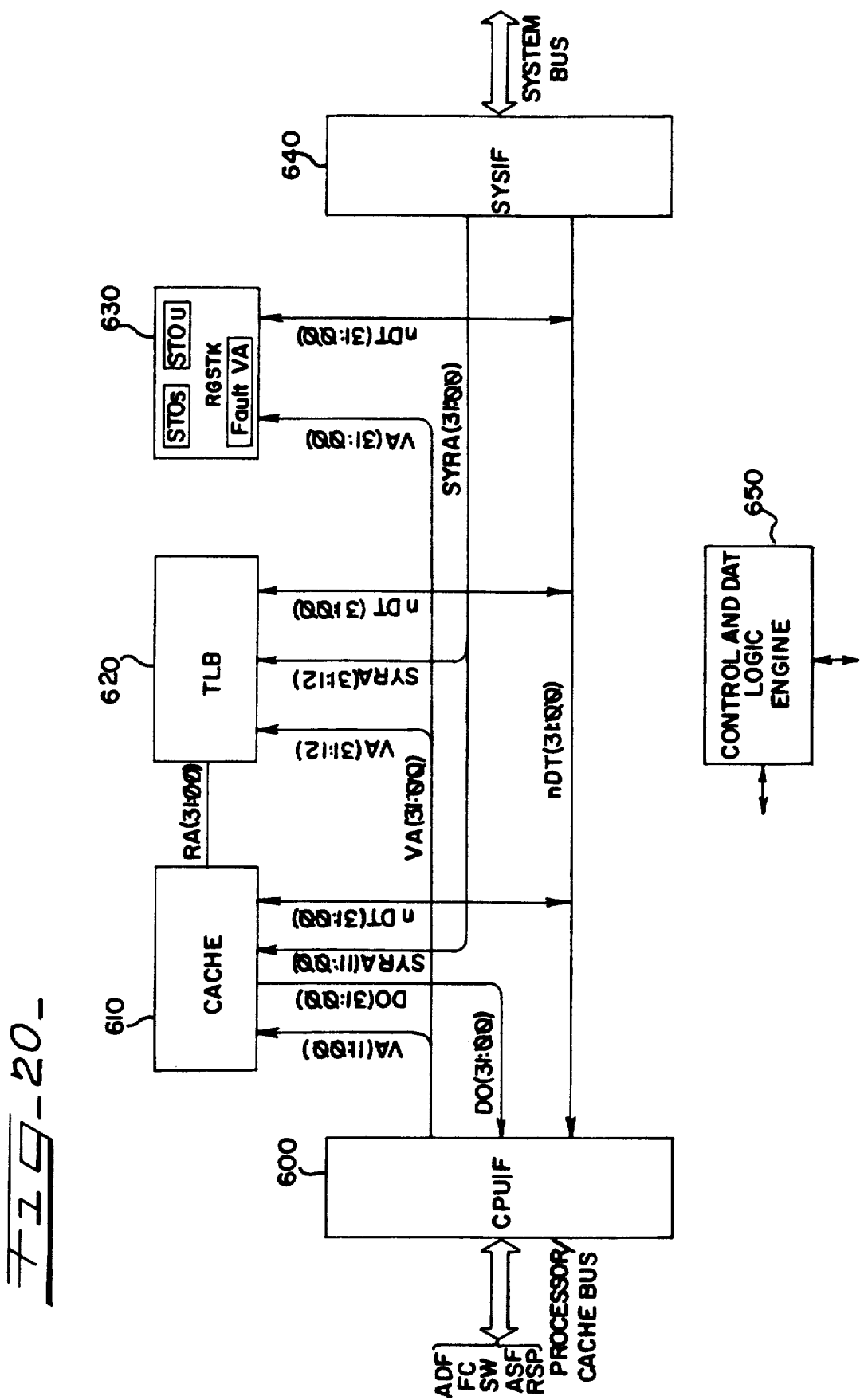
FIG. 20 illustrates a block diagram of the cache-MMU system, including bus interface structures internal to the cache-MMU.

Referring to FIG. 20, a block diagram of the cache-MMU is illustrated. The processor to cache bus, 121 or 131 of FIG. 1, couples to the CPU interface 600. The cache memory subsystem 610, TLB subsystem 620, registers 630, system interface 640, and microprogrammed control and DAT logic 650 are all coupled to the CPU interface 600. A virtual address bus (i.e. VA) is coupled from the CPU interface 600 to each of the cache subsystem 610, TLB subsystem 620, and register subsystem 630. A data output bus (i.e. DO) from the cache subsystem 610 to the CPU interface 600 couples the data output from the memory subsystem of the cache memory subsystem 610, illustrated as DO(31:00).

A bidirectional data bus, designated nDT(31:00) provides selective coupling of data, virtual address, real address, or the contents of STO register, depending upon the operation being performed by the cache-MMU. The nDT bus couples to cache-MMU system elements 600, 610, 620, 630, 640, and 650. The system interface 640 couples to the system bus on one side and couples to the nDT bus and the SYRA bus on the internal cache-MMU side. The SYRA bus provides a real address from the system bus via the system interface 640 to the TLB 620 and cache subsystem 610. As illustrated, the least significant 12 bits, representing the displacement portion of the address, are coupled to the cache memory subsystem 610. The most significant 20 bits, SYRA(31:12) are coupled from the SYRA bus to the TLB subsystem 620. The control and DAT logic 650 coordinates system bus interface after a TLB 620 miss or cache subsystem 610 miss, and controls DAT operations.

Figure 21:
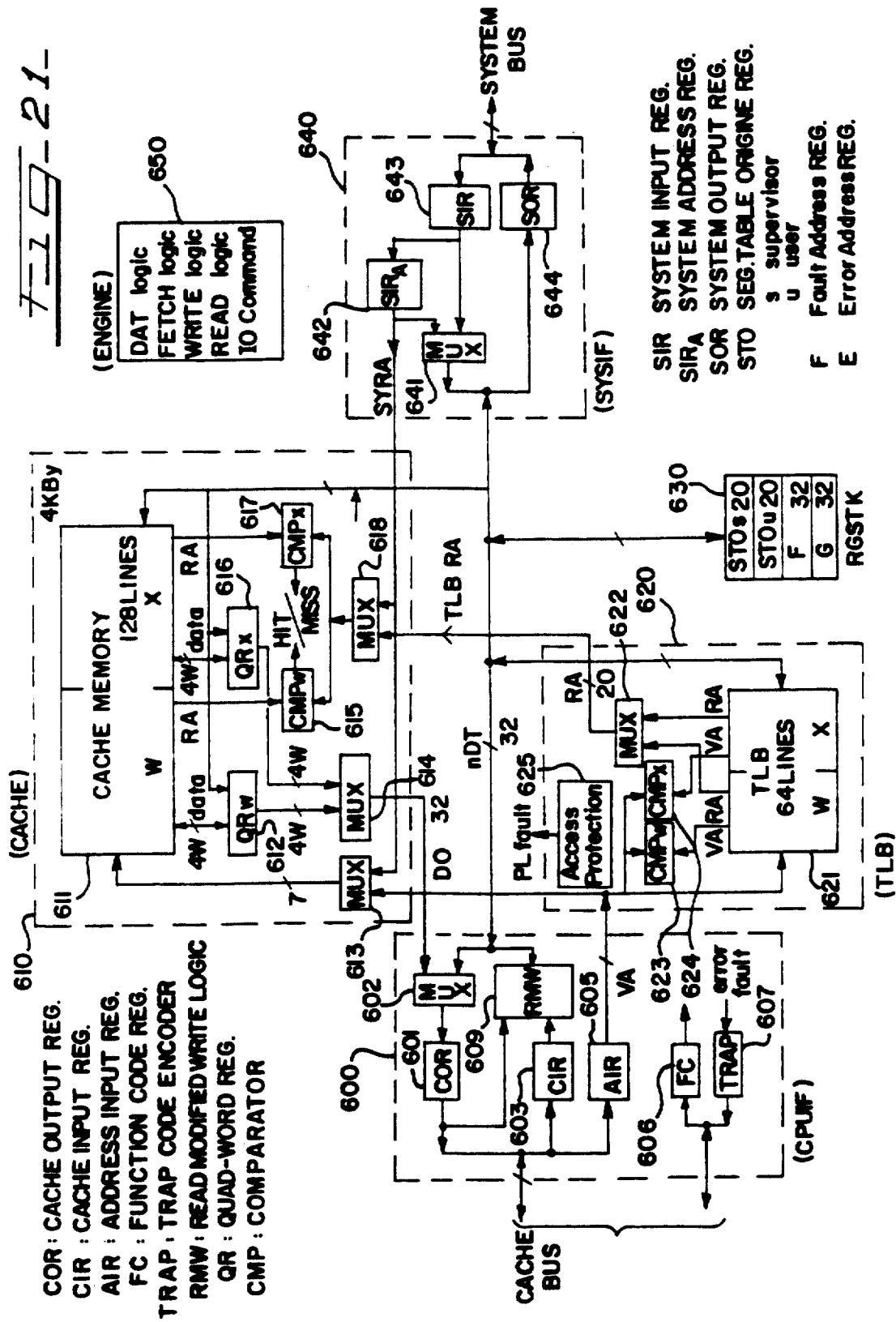
FIG. 21 is a more detailed electrical block diagram of FIG. 20.

Referring to FIG. 21, a more detailed block diagram of FIG. 20 is illustrated. The cache output register 601, cache input register 603, and address input register 605 of the CPU interface 600 are described in greater detail with reference to FIG. 8. FIG. 21 further illustrates the multiplexer 602, read-write logic 604 for performing read/modify/write operations, function code register 606 and trap encoder 607.

The read/modify/write logic 604 coordinates multiplexing of the cache memory subsystem output, via multiplexer 614 from the cache memory 611 of the cache memory subsystem 610, and via multiplexer 602 of CPU interface 600 for selective interconnection to the cache output register 601 and therefrom to the processor/cache bus. Alternatively, the multiplexer 602 can receive data from the system bus interface 640 via the nDT bus internal to the cache-MMU system, or from the read/modify/write logic 604. The RMW logic 604 has as inputs thereto the cache output register 601 output, and the cache input register 603 output. The function code register 606 and trap code encoder 607 are coupled to the processor. The function code register 606 is responsive to function codes received from the processor for providing signals to other portions of the cache-MMU system. The trap logic 607 responds to error faults from within the cache-MMU system and provides outputs to the processor responsive to the trap logic for the given error fault.

The cache memory subsystem 610 is comprised of a cache memory array 611 having two 64-line cache stores, as described with reference to FIG. 9. The quadword output from each of the W and X halves of the cache memory array 611 are coupled to respective quadword line registers 612 and 616. Quadword registers 612 and 616 are each independently coupled to the nDT bus, for coupling to the processor/cache bus via the CPU interface 600 or the system bus via the system interface 640.

The real address outputs from the W and X halves of the cache memory array 611 are coupled to one input each of comparators 615 and 617, respectively, each of which provide a hit/miss signal output. The other inputs of each of the comparators 615 and 617 are coupled to the output of multiplexer 618. The multiplexer 618 outputs a real address. The real address inputs are coupled to the multiplexer 618 from the system bus interface 640 via the SYRA bus therefrom, and from multiplexer 622 of the TLB subsystem 620, which provides a translated real address from its TLB memory array 621 responsive to a physical address received from the processor/cache bus via the CPU interface 600.

The quadword registers 612 and 616 each have independent outputs coupling to multiplexer 614. Multiplexer 614 selectively outputs the word of selected information to multiplexer 602 for selective coupling to the cache output register 601.

As discussed with reference to FIG. 9, multiplexer 613 selectively couples a lower portion of a real address, either from the CPU interface 600 or from the TLB 620, to the multiplexer 613 for selective output and coupling to the cache memory array 611, to select a line therein.

The TLB memory array 621 selectively provides output from a selected line therein responsive to either an address from the nDT bus or an address supplied from the CPU interface 600 as output via the address input register 605. A portion (i.e. lower portion bits 17 to 12) of the virtual address output of address input register 605 is coupled to the TLB memory subsystem 621 and a more significant portion (i.e. bits 31 to 18) is coupled to one input each of comparators 623 and 624 of the TLB 620. The translated virtual address output from the TLB memory array subsystem 621, for each of the W and X halves, as discussed with regard to FIG. 9, are coupled to the other inputs of comparators 623 and 624. Comparators 623 and 624 each provide independent hit/miss signal outputs. The multiplexer 622 has Real Address inputs coupling thereto as output from the W and X halves of the TLB memory subsystem 621. The multiplexer 622 selectively provides output of the translated real address to the input of multiplexer 618 of the cache memory subsystem 610, responsive to the hit/miss outputs of comparators 623 and 624.

The address protection logic 625 provides selective protection of read and write access for certain TLB lines, responsive to information as initially loaded from the page table entry as discussed with reference to FIG. 19.

The registers 630 include segment table origin supervisor and user registers, and a fault address register F.

The control and DAT logic 650 provides direct address translation logic, fetch logic, write logic, read logic, and I/O command operational logic.

Figure 22:
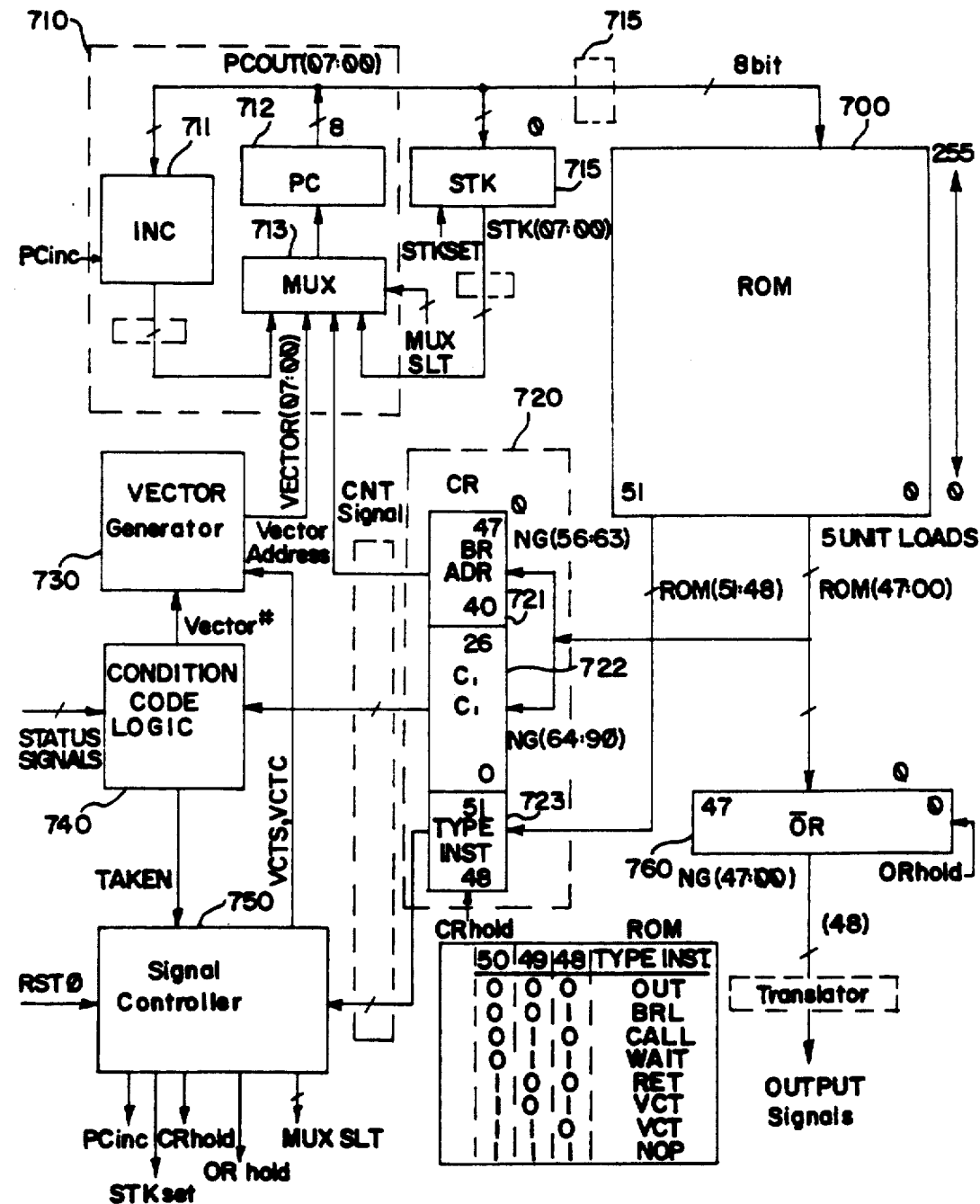
FIG. 22 is a detailed electrical block diagram of the control logic microengine 650 of FIG. 21.

Referring to FIG. 22, a detailed block diagram of the control logic microengine 650 of FIG. 21 is illustrated. The microengine is comprised of a read-only memory 700 and a microengine operational subsystem comprising program counter 710, stack pointer 715, instruction register 720, vector generator 730, condition code signal selector 740, signal controller and instruction decoder 750, and output register 760.

The program counter 710 is comprised of a program counter-accumulator register 712, a multiplexer 713, and increment logic 711. The multiplexer 713 provides a signal output to the program counter-accumulator register 712 responsive to a multiplex select signal MUXSLT, as output from the signal controller/instruction decoder 750. This selects one of: the eight bit vector address outputs from the vector generator 730; the output of the next sequential program counter address from the increment logic 711, responsive to a PC increment signal PCINC as output from the signal controller/instruction decoder system 750; or a branch address as output from the branch address register of the instruction register 720. The output of the multiplexer 713 is coupled to the program counter accumulator register 712 for selective output therefrom as a PC output address PCOUT. PCOUT is coupled to the increment logic 711, to the stack pointer 715, and to the address selection inputs of the read-only memory subsystem 700.

As illustrated in FIG. 22, the memory 700 includes 256 lines of 52 bits each, each line having an instruction and/or data value to be output to the instruction register 720 and/or the output register 760. The most significant bit positions (i.e. output bits 51 to 48) are coupled from the read-only memory subsystem 700 to the Type of Instruction register 723 of the Instruction Register 720. These bits indicate whether the remaining bits of the line comprise an instruction or control signal output. The remaining bits of the line (i.e. bits 47 to 0) are coupled to the output register 760, and to the instruction register 720. These bits are coupled to the branch address register 721 (i.e. bits 40 to 47 of the read-only memory 700 output) and to the condition code register 722 (i.e. bits 26 to 0).

The output from the instruction register 723 is coupled from the instruction register 723 to the signal controller 750. The instruction register 723 outputs instruction type information, responsive to a CRhold signal as output from the signal controller 750. For example, utilizing bits 48 to 51 of the read-only memory 700 output, a 000 could indicate an output instruction, 001 a branch instruction, 010 a call instruction, 011 a wait instruction, 100 a return instruction, 101 and 110 vector operations, and 111 a no-op operation.

The output of the condition code register 722 is coupled to the condition signal selection logic 740. The condition code decoder 740 also has condition code and status inputs coupled to it. These signals indicate a cache or TLB miss, a function code to tell the status of the operation such as read or write, status and condition code information, etc. The condition code decoder 740 provides a "taken" output to the signal controller 750 to indicate status, and further outputs a vector number to the vector generator 730. The combination of the miss and/or function code information defines the destination address for the vector process.

The signal controller 750 provides vector signal timing outputs (i.e. VCTS, VCTC) coupled to the vector generator 730. Where a vector operation is indicated, the vector address is loaded from the vector generator 730 into the program counter accumulator 712 via multiplexer 713, and the PC counter 710 is incremented to sequence instructions until the vector routine is completed.

The branch address register 721 selectively outputs branch address signals to the program counter 710 for utilization thereby in accordance with control signals as output from the signal controller and instruction decoder 750. Output of signals from the output register 760 are responsive to the selective output of an output register hold "OR hold" signal from signal controller 750 to the output register 760. The signals as output from the output register 760 are coupled to other areas of the cache-MMU system (i.e. control signals and/or data) for utilization by the other areas of the cache-MMU system.

Briefly summarizing the above, control logic microengine 650 is a microprogrammed controller that executes instructions from ROM 700 to provide control signals to the cache-MMU., The output instruction causes 48 bits of stored control information to be placed in register 760 for control of the cache-MMU. The conditional branch instruction causes microprogram control to pass to a branch location if the conditions specified by the condition code are met. The vector instructions cause microprogram control to pass to a location specified by the vector generator if specified conditions are met. The no operation instruction causes the microprogram controller to take no action. The wait instruction causes the microcontroller to pause until specified conditions are met. The call and return instructions cause transfer to and return from a microprogram subroutine. Microengine 650 cooperates with other parts of the control and DAT logic as set forth herein to access main memory, as described, for example, with respect to FIG. 8 and 9 (DAT 280), and particularly with respect to FIGS. 18 and 19.

Figure 23:
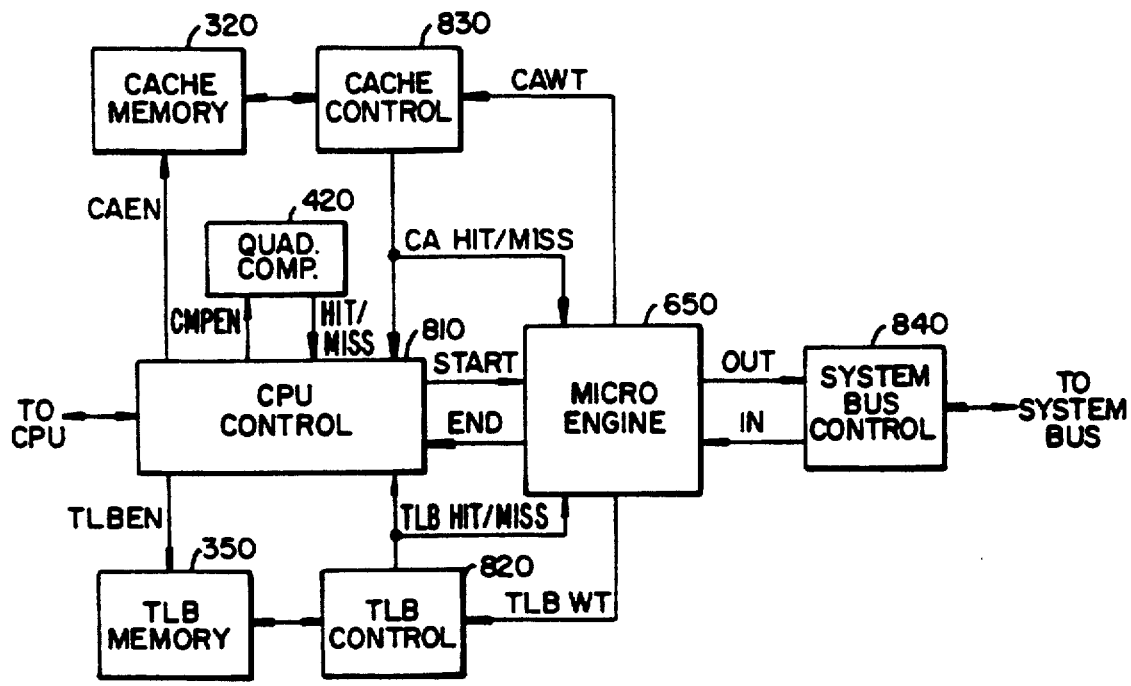
FIG. 23 illustrates an arrangement of the major control and timing circuits for the Cache-MMU.

FIG. 23 shows the arrangement of the major control and timing circuits for the cache-MMU. Sequencing for the cache-MMU is provided chiefly by two circuits, the CPU interface and control circuit 810 (CPCTL) and the control logic microengine 650. TLB control circuit 820 (TLBCTL) and cache control circuit 830 (CACTL) principally provide output decoding, and logic for placing entries at the proper locations within TLB and cache memory, respectively. System Bus control circuit 840 (SYSCTL) principally provides synchronization of signals between the microengine and the System Bus. For clarity, data and address busses of the cache-MMU are not shown explicitly in FIGS. 23 through 27 although certain data and address signals do appear as necessary to enhance the description. It will be understood that the data and address busses extend throughout.

CPCTL provides cache-MMU interface to the CPU through the cache bus 121 or 131 and the System Status Word, SSW, line 115. CPCTL responds to CPU requests for memory activity, and performs the sequencing necessary to locate the data in the line buffer, TLB and cache memory. To provide high speed response to the CPU, CPCTL is implemented as a state machine. If CPCTL is not successful in locating the data within the cache-MMU, CPCTL initiates the microengine to perform additional searching. For example, the microengine provides the sequencing needed to perform several reads from main memory in order to obtain page table entries (on TLB miss) and bring the target data into the cache (on cache miss). In some embodiments, the microengine may be implemented as a state machine, as is CPCTL. However, since the microengine sequences are relatively lengthy and complex, it is convenient to implement the microengine as a microprogrammed sequencer, and such an embodiment is set forth herein.

In response to CPU instructions requiring cache-MMU action such as load register, memory store, test and set bit, CPCTL sends enable signals simultaneously to the TLB memory 350, cache memory 320 and the address comparator for the cache output line buffer (quadword boundary comparator 420, FIG. 14). The line buffer (line register 400) contains the four words obtained during the last cache access, and in effect provides a "cache within a cache." Each of the three enabled circuits attempts to find/translate the address appearing on the virtual address bus. The three operations are fully overlapped to minimize delays. In the preferred embodiment, TLB and cache memory are made up of static memory elements. No sequencing takes place in the TLB and cache memory, so that their actions are subject only to logic propagation delays. In the event of a quadword hit, CPCTL returns the found data word on the DT bus and performs the requested CPU action. In the event of a TLB miss, CPCTL signals the microengine to read main memory for address translation. After the TLB entry is written, the microengine signals completion and the CPCTL retrys. In the event of a cache miss, CPCTL signals the microengine to read main memory for the data word sought, update the cache, and perform the requested CPU operation. The microengine provides signals to the System Bus through System Bus control circuit 840 which synchronizes microengine signals with the System Bus clock.

FIG. 24 shows CPU control circuit 810, CPCTL, in more detail. CPCTL is a state machine that steps through a sequence of predetermined states contained in register 910, in synchronism with clock signal MCLK, providing output signals to the rest of the cache-MMU both directly and through output decoder 920. The present state of register 910 is returned through input decoder 930 where it is decoded in combination with a number of inputs from the cache bus and from various cache-MMU circuits to determine the next register state. Signals from input decoder are routed through one of two gating circuits, D-gate circuit 940 or I-gate circuit 950. Signal INST/NDATA appearing on input pin 960 enables one of the two gating circuits and disables the other, thereby defining the use of the cache-MMU as either an instruction cache-MMU or a data cache-MMU. A logical one appearing on the INST/NDATA pin enables I-gate circuit 950 and disables D-gate circuit 940, thereby causing control circuit 810 to sequence through states suitable for operating the cache-MMU as an instruction cache-MMU. A logical zero appearing on the INST/nDATA pin enables D-gate circuit 940 and disables I-gate circuit 950, thereby causing control circuit 810 to sequence through states suitable for operating the cache-MMU as a data cache-MMU. Note that two names, INST and NDATA, are provided for pin 960 and the signal it carries.

An example of different operations by the two types of cache-MMUs is in instruction prefetch. When enabled, the instruction cache-MMU will prefetch the four instruction words that follow the current instruction address. This reduces system response time for strings of sequential instructions. Prefetch strategy is not as successful in reducing access delays for data, so no prefetch is done in the data cache-MMU. As another example, only the data cache-MMU performs writes in the present embodiment. Such differences in operation result in differences in state transitions effected by D-gate circuit 940 and I-gate circuit 950.

Inputs to CPCTL include information from the CPU (FCR, function code register) indicating the requested operation, such as register load, memory write, test and set, and byte, halfword, fullword or doubleword operations. Output of state control Register 910 is provided to the microengine condition code logic circuit 740 (FIG. 22), along with other control information. As one example, CPCTL provides an increment signal to the address input register 210 (AIR1, FIG. 14). In the data cache-MMU, AIR1 functions as a data address register. It is incremented as needed in order to address the second word of a double word read operation. In the case of an embodiment providing multiple word or block transfers, AIR1 would be incremented as needed to provide an appropriate word counter. In the instruction cache-MMU, AIR1 functions as a program counter, remote from the program counter located in the CPU. AIR1 is incremented with the transfer of each instruction word to the CPU. AIR1 thus contains the virtual address of each instruction as it is fetched for execution (or as it is prefetched prior to execution in a pipelined CPU using prefetch, and/or as it is prefetched by the instruction cache-MMU reading ahead of the CPU requests as described previously). AIR1 is incremented as long as instruction fetches are sequential, in response to the ISEND (cache advance) signal appearing on the instruction Cache-MMU bus. Upon program transfer or context switch, AIR1 is loaded with the destination address of the transfer or switch, and instructions are supplied from the new location.

Additional input and output signals to other cache-MMU circuits may be provided for in CPCTL as needed for the implementation of specific features, as will be evident to those skilled in the art. Description of such additional signals would burden this disclosure unnecessarily.

FIG. 25 shows TLB control circuit 820, TLBCTL, in more detail. Bits <17:12> of the virtual address select a line set in the W and X compartments. Bits <31:18> of the virtual address are compared with the VA tag of both compartments. If there is a match, and if appropriate access protection bit states allow access, the 20 bit real address field of the matching W or X line is multiplexed and transferred to the cache as real address bits <31:12> where they are used to validate the cache data (FIG. 21). Decoder 1010 -decodes the access control bits from the TLB and signals CPCTL if access protection is violated. TLB hit detector 1020 responds to a hit signal from either of the two TLB compartments, however a hit from the HTLB takes precedence, as set forth with respect to FIGS. 8a and 8b. An unmapped address signal from the CPU SSW causes a TLB hit to be generated so that unnecessary address translation is prevented from occurring. Decoder 1030 decodes addresses used for direct I/O access signaled by the HTLB. Memory mapped I/O includes internal cache-MMU registers (630, FIG. 21 and 1260, FIG. 27), reset signals, and TLB memory locations. Write strobe generator 1040 causes the TLB to be updated upon instruction from the microengine in the compartment selected by replacement logic circuit 1050. Circuit 1050 responds to the SV and UV bits from the TLB line, indicating that the TLB line is used only for supervisor mode or only for user mode operations, respectively, and the U field which is complemented on each update to indicate that the other (W or X) compartment is to be used on the next update request.

FIG. 26 shows cache control circuit 830, CACTL, in more detail. Virtual address bits <11:2> are used directly as real address bits <11:2> to access cache data. Address bits <10:4> select one of the line sets in the W and X compartments. Address bits <31:12> from the TLB are compared with the real address field of both compartments. If there is a match, the four data words are read into the line buffer. Cache hit detector 1110 responds to hit signals from both W and X compartments, to TLBHIT indicating that the real address is valid, and to the cacheable bit from TLBCTL indicating that the address sought is not, for example, memory mapped I/O. Write strobe generator 1120 responds to cache write signals from the microengine to update the cache contents on cache miss, and to cache write signals from CPCTL on CPU store operations. Quadword transfers to cache are controlled by counter 1240 in SYSCTL which provides low order address bits and progress control signals. Cache replacement logic circuit 1130 outputs to generator 1120 to select the W or X compartment on cache update. Circuit 1130 responds to the line valid, U and E bits in the cache. As described with respect to TLBCTL, the U bit causes alternate compartments to be used on each successive cache update. The line is marked invalid when the quadword has been invalidated by SYSCTL on a bus watch operation, and the E bit is provided in specific embodiments to permanently mark the line busy when a defective memory location is found during manufacture.

FIG. 27 shows System Bus control circuit 840, SYSCTL, in more detail. A principal function of SYSCTL is to synchronize signals communicated between the System Bus and microengine 650. To this end, SYSCTL includes bus clock rate detector 1210 having inputs from the CPU clock MCLK and the System Bus clock BCLK and outputs to the microengine and to synchronizer 1230 which gates control signals to the System Bus. Read/write logic circuit 1220 is enabled by the microengine when a read or write of main memory is needed to update the cache, to access page table entries, write altered data or any other purpose. Ready signal RDY appears on the System Bus when data is valid, circuit 1220 sends a set signals to System Bus input register 260 which latches the information present on the System Bus address/data leads for reading data. Similarly, System Bus output register 250 is latched with address/data appearing on the cache-MMU internal bus for data writes. Transfer takes place when the microengine asserts appropriate System Bus control signals such as BR to become bus master, TR to request data transfer, and NDIR to indicate the direction of the transfer. In the case of multiple word reads, for example the cache-MMU does quadword reads in order to fill a quadword line entry in cache memory, counter 1240 counts the number of words as they are being read. Counter 1240 outputs to CACTL to provide address bits and indicate the progress of the quadword transfer. SYSCTL produces an output to the microengine when each transfer is ended.

Bus Watch detector 1250 forms a part of SYSCTL. The cache-MMU monitors transfers on the System Bus in order to keep up to date the contents of data residing in the cache. Many data transfers do not concern the cache contents, so it would be ineffecient for each System Bus data transfer to initiate a cache inquiry to determine if cache should be updated. This would cause an unacceptably high level of cache traffic, locking out the cache-MMU from doing other work. To reduce the number of cache inquiries to an acceptable level, detector 1250 monitors the TG and CT fields as data is transferred on the System Bus in order to filter out only those transfers that are eligible for caching. TG and CT carry information on the caching policy in effect for each word transferred so that, for example, non-cacheable transfers are prevented from causing inquiries to the cache. When dectector 1250 determines that a transfer is taking place of data that may be present in the cache, the detector outputs to the microengine to begin a cache inquiry sequence. If the data is found in the cache, the microengine will take one of three actions, either updating the cache data on a single word write to main memory, marking the cache data invalid (LV bit) on a quadword write to main memory, or by intervening in the transfer and returning the cached data in the case of a read from main memory of data that has been modified in the cache (LD bit). Control signals from the control register 1260 enable detector 1250 to monitor System Bus transfers of different types, such as watch CPU writes of shared data, watch I/O writes of cacheable data or watch I/O reads of copyback data. A further input to detector 1250 is INST/NDATA which defines the cache-MMU as either an instruction cache-MMU or a data cache-MMU. The instruction cache-MMU responds to only a limited set of caching policies, since data transfers between the CPU and main memory are normally done through the data cache-MMU. Detector 1250 is also used to write registers within the instruction cache-MMU. Since the instruction cache-MMU would not normally provide write capability in many embodiments, the data cache-MMU advantageously provides memory mapped I/O decoding of writes into instruction cache-MMU control registers. The memory mapped I/O transfer request appears on the System Bus like other such requests, and instruction cache-MMU detector 1250 responds by addressing the appropriate internal register and gating System Bus data.

While there have been described above various embodiments of the present invention, for the purposes of illustrating the manner in which the invention may be used to advantage, it will be appreciated that the invention is not limited to the disclosed embodiments. Accordingly, any modification, variation or equivalent arrangement within the scope of the accompanying claims should be considered to be within the scope of the invention.

What is claimed is:

1. In a computing system having a cache memory coupled to a processor via a processor/cache bus and to a main memory via a system bus, wherein the computing system operates in supervisor and user modes, a method of translating a virtual address to a real address comprising the steps of:

receiving an externally supplied virtual address comprising a virtual segment address and a virtual page address;

addressing a translation lookaside buffer with the virtual address for translating the virtual address to a real address;

determining whether the virtual address was correctly translated by the translation lookaside buffer;

addressing a dynamic address translation means with the virtual address for translating the virtual address to a real address if the virtual address was not correctly translated by the translation lookaside buffer;

wherein the step of addressing the translation lookaside buffer comprises the steps of:

addressing a plurality of read/write memory elements which translates virtual addresses to real addresses with bits from the virtual page address when the computing system operates in both the supervisor mode and the user mode;

addressing hardwired combinational logic which translates predetermined virtual addresses to predefined real addresses with bits from the virtual segment address when the computing system is operating in the supervisor mode; and always preventing the dynamic address translation step whenever one of the predetermined virtual addresses is to be translated and the computing system is operating in the supervisor mode.

2. In a computing system having a cache memory coupled to a processor via a processor/cache bus and to a main memory via a system bus, an address translation apparatus comprising:

virtual address input means for receiving an externally supplied virtual address, the virtual address including a virtual segment address and a virtual page address;

address translation means for selectively providing a real address output responsive to the virtual address, the address translation means comprising:

modifiable translation means including modifiable read-write memory for translating virtual addresses to real addresses; and non-modifiable translation means for translating predetermined virtual addresses to predefined real addresses;

translation addressing means, coupled to the virtual address input means and to the address translation means, for addressing the modifiable translation means with bits from the virtual page address and for simultaneously addressing the non-modifiable translation means with bits from the virtual segment address;

predefined translation detecting means for detecting whether the virtual address is translatable by the non-modifiable translation means; and real address selecting means, responsive to the predefined translation detecting means, for selecting the real address from the non-modifiable translation means when the virtual address has been translated by the non-modifiable translation means.

3. The apparatus according to claim 2, wherein the translation addressing means addresses the non-modifiable translation means with bits from the virtual segment address and bits from the virtual page address.

4. The apparatus according to claim 3 wherein the translation addressing means addresses the modifiable translation means only with bits from the virtual page address.

5. The apparatus according to claim 2 wherein the virtual address comprises thirty-two bits designated [31 . . . 0], wherein the translation addressing means addresses the non-modifiable translation means with bits [31 . . . 15], and wherein the translation addressing means addresses the modifiable translation means with bits [17 . . . 12].

6. The apparatus according to claim 2 wherein the virtual address comprises thirty-two bits designated [31 . . . 0], wherein the translation addressing means addresses the non-modifiable translation means with only bits [31 . . . 15], and wherein the translation addressing means addresses the modifiable translation means with only bits [17 . . . 12].

7. The apparatus according to claim 2 wherein the non-modifiable translation means comprises hardwired combinational logic.

8. The apparatus according to claim 2 wherein the non-modifiable translation means comprises combinational logic and read-only memory.

9. The apparatus according to claim 2 wherein the computing system operates in supervisor and user modes and provides a mode signal indicating in which mode the computing system is operating, and wherein the non-modifiable translation means includes operation enabling means, responsive to the mode signal, for enabling the translation of the virtual address when the mode signal indicates the computing system is operating in supervisor mode and for disabling the translation of the virtual address when the mode signal indicates the computing system is operating in user method.

10. The apparatus according to claim 9 wherein the non-modifiable translation means translates the virtual address into a real address that is different from the virtual address.

11. The apparatus according to claim 9 wherein the non-modifiable translation means translates the virtual address into a real address corresponding to one of a plurality of selected address space.

12. The apparatus according to claim 9 wherein real addresses are provided for main memory space, input/output space, and boot ROM space, and wherein the non-modifiable translation means only translates the virtual address into a real address corresponding to one of the main memory space, input/output space, or boot ROM space.

13. The apparatus according to claim 9 wherein real addresses are provided for main memory space, input/output space, and boot ROM space, and wherein the non-modifiable translation means translates the virtual address into a real address corresponding to one of the main memory space, input/output space, or boot ROM space.

14. The apparatus according to claim 13 wherein real addresses are provided for addressing internal registers, and wherein the non-modifiable translation means translates the virtual address into a real address corresponding to one of the internal registers.

15. The apparatus according to claim 13 wherein real addresses for at least one of the main memory space, input/output space, or boot ROM space are different from the virtual address from which the real address was translated.

16. The apparatus according to claim 13 wherein real addresses for input/output space and boot ROM space are different from the virtual address from which the real address was translated.

17. The apparatus according to claim 13 wherein the non-modifiable translation means translates virtual addresses having virtual page addresses corresponding to pages 0, 1, 2, and 3 into a real address corresponding to pages 0, 1, 2, and 3 in main memory space.

18. The apparatus according to claim 13 wherein the non-modifiable translation means translates virtual addresses having virtual page addresses corresponding to pages 4 and 5 into a real address corresponding to pages 0 and 1 in input/output space.

19. The apparatus according to claim 13 wherein the non-modifiable translation means translates virtual address having virtual page addresses corresponding to pages 4 and 5 into a real address corresponding to pages 0 and 1 in boot ROM space.

20. The apparatus according to claim 9 wherein the modifiable translation means translates the virtual address when the computing system operates in both the supervisor mode and the user mode, and wherein the real address selecting means selects the real address derived from the non-modifiable translation means when the non-modifiable translation means is addressed by one of the predetermined virtual addresses when the computing system is operating in supervisor mode, and selects the real address derived from the modifiable translation means when:

(i) the non-modifiable translation means is not addressed by one of the predetermined virtual addresses and the computing system is operating in supervisor mode; or (ii) the computing system is operating in the user mode.

21. The apparatus according to claim 20 wherein the modifiable read-write memory includes a plurality of lines of translation data, each line of translation data including the real address and a system tag, and wherein the real address corresponds to one of a plurality of address spaces designated by the system tag.

22. The apparatus according to claim 21 wherein each line of translation data includes protection level data.